US007189380B2

(12) United States Patent  (10) Patent No.: US 7,189,380 B2
Singh  (45) Date of Patent: Mar. 13, 2007

(54) EXTRACTION OF METALS WITH DIQUATERNARY AMINES

(75) Inventor: Waheguru Pal Singh, College Station, TX (US)

(73) Assignee: Lynntech, Inc., College Station, TX (US)

( * ) Notice: Subject to any disclaimer, the term of this patent is extended or adjusted under 35 U.S.C. 154(b) by 443 days.

(21) Appl. No.: 10/647,104

(22) Filed: Aug. 21, 2003

(65) Prior Publication Data

US 2004/0115107 A1    Jun. 17, 2004

Related U.S. Application Data

(63) Continuation-in-part of application No. 10/071,872, filed on Feb. 7, 2002, now Pat. No. 6,890,496, which is a continuation-in-part of application No. 10/427,028, filed on Apr. 30, 2003.

(51) Int. Cl.
  *C01G 55/00*   (2006.01)
  *B01D 11/00*   (2006.01)
(52) U.S. Cl. ............................. 423/22; 423/24; 75/722; 210/634; 210/638; 210/684
(58) Field of Classification Search ................. 433/22, 433/24; 75/722; 210/634, 638, 684
  See application file for complete search history.

(56) References Cited

U.S. PATENT DOCUMENTS

| | | | |
|---|---|---|---|
| 4,012,481 A | 3/1977 | Baltz et al. | |
| 4,041,126 A | 8/1977 | Baltz et al. | |
| 4,105,742 A | 8/1978 | Edwards et al. | |
| 4,382,067 A | 5/1983 | Grant | |
| 4,571,266 A | 2/1986 | Konig et al. | |
| 4,726,841 A | 2/1988 | Grant et al. | |
| 4,861,564 A | 8/1989 | Rebek | |
| 5,165,901 A | 11/1992 | Crozier et al. | |
| 5,256,187 A | 10/1993 | Gefvert | |
| 5,284,633 A | 2/1994 | Gefvert | |
| 5,380,947 A | 1/1995 | Chen et al. | |
| 5,478,376 A | 12/1995 | Grant et al. | |
| 5,908,814 A | 6/1999 | Patel et al. | |
| 6,207,143 B1 | 3/2001 | Lezdey et al. | |
| 6,890,496 B2 * | 5/2005 | Singh et al. .................. | 423/22 |
| 2003/0190274 A1 | 10/2003 | Singh | |
| 2003/0226761 A1 | 12/2003 | Featherstone et al. | |

FOREIGN PATENT DOCUMENTS

| | | |
|---|---|---|
| CN | 1146495 A | 4/1997 |
| ZA | 8006992 | 10/1981 |

OTHER PUBLICATIONS

Translation of CN 1146495A, Apr. 2, 1997.*
International Search Report, Application No. PCT/US 03/05444, International Filing Date Feb. 24, 2003, 3 sheets.

Jan G. H. du Preez, Elmaré S. Herselman, Hans E. Rohwer, and Bennie J.A>M>van Brecht; "Polynitrogen regents in metal seprations. Part 2. Diquaternary ammonium cations as precipitants for cobalt (II) and copper ;(II) in hydrochloric acid medium"; South African Journal of Chemistry, vol. 38, No. 2, 1985 pp. 49053, XP009016468.
J. G. H. du Preez, D. P. Shillington and B.J.A.M. van Brecht; "Polynitrogen Reagents in Metal Sepration. Part 1. Ditertitary and Diquaternary Ammonium Extractants for Cobalt (II) and Copper (II) in HCl Medium"; Solvent Extraction and Ion Exchange, vol. 2 No. 6, 1984 pp. 839-858, XP009016470.
XP 002253113, Database CA Online, chemical Abstracts Service, Columbus, Ohio, US; Du Preez, Jan Gysbert Hermanus: "Organic diammonium and related compounds as solvent extractants", retrieved from STN data base accession No. 97: 42075.
International Search Report, International Application No. PCT/US 03/05444, International Filing Date Feb. 24, 2003, 6 pages.
WPI abstract; AN: 2001-103670 XP-002262954 & CN 1 146 495 (UNIV LAMZHOU ()CN)); Apr. 2, 1997.
JP 10 008155 A (Nakazawa Hiroyuki (JP)) Jan. 13, 1998 & PAJ abstract.
JP 59 179724 A (Tanaka Kikinzoku Kogyo KK (JP)) Oct. 12, 1984 & PAJ abstract.
JP 58 1754532 A (Tanaka Kikinzoku Kogyo KK (JP)) Oct. 13, 1983 & PAJ abstract.
WPI abstract: AN 1979-002004 XP 002262955 & RO 65 77 6 A (Combinatul Petrochimic (RO)) Dec. 15, 1978.
Vanessa J. Wotring, David M. Johnson, and Leonidas G. Bachas; Polymeric Membrane Anion-Selective Electrodes Based on Diquaternary Ammonium Salts; Anal Chem. 1990, 62, pp. 1506-1510.
J. Letho; "Ion Exchange in the Nuclear Power Industry"; Ion Exchange Process Advances and Applications; pp. 39-53.
M. A. Sadler, "Developments in the Production and Control of Ultrapure Water"; Ion Exchange Process Advances and Applications; pp. 15-28.

(Continued)

*Primary Examiner*—Steven Bos
(74) *Attorney, Agent, or Firm*—Streets & Steele; Jeffrey L. Streets

(57) ABSTRACT

Selective extraction of one or more metal anions from an aqueous solution, by contacting the aqueous solution with an organic solution including a diquaternary amine, wherein the diquaternary amine has two diquaternary nitrogens spaced at a distance of less than about 10 Å, selectively binding the metal anions to the diquaternary amine, and then separating the organic solution from the aqueous solution, wherein the diquaternary amines having the selectively bound metal anions are concentrated in the organic solution. Alternatively, the diquaternary amines may be adsorbed or chemically bonded to a solid, and the metal anion-containing aqueous solution passed over the solid having the diquaternary amines. Palladium may be selectively extracted by contacting the acidic solution with an iodide and an organic solvent, allowing the palladium to bind to the iodide, and then separating the organic solution from the aqueous solution, concentrating the bound palladium ions in the organic solution.

6 Claims, 16 Drawing Sheets

OTHER PUBLICATIONS

Arup K. Sengupta and Tushar Roy; "Ion Exchange Mechanism, Resin Properties and Selective Removal of Hexavalent Chromate"; pp. 194-203.

S. Fredric Marsh; "The Effect of Trimethyl, Triehyl, Tripropyl, and Tributyl Amine Functional Groups in Strong-base Anion Exchange Resin on the Sorption fo Pu(iv) from Nitric Acid".

Piers Grumett, "Precious Metal Recovery fromSpent Catalysts"; Platinum Metals Rev, 2003, 47, (4) pp. 163-166.

International Search Report, International Application No. PCT/US2004/013745; International Filing Date Apr. 5, 2004; 4 pages.

* cited by examiner

| Compound | D-Value Pd II | Conformation Minimum Energy (kcal/mole) | Connectivity Index (order 2, standard) D | Dipole Moment (debye) E | Electron Affinity (eV) F |
|---|---|---|---|---|---|
| DQ 18 | 2.86 | 39.331 | 11.632 | 12.744 | 7.127 |
| DQ 16 |  | 39.449 | 11.985 | 2.933 | 6.601 |
| DQ 10 | 1.75 | 40.322 | 12.692 | 0.01 | 5.948 |
| DQ 14 | 2.6 | 39.924 | 11.071 | 25.323 | 8.122 |
| DQ 17 | 3.3 | 50.797 | 17.289 | 25.52 | 7.139 |
| DQ 15 | 0.42 | 49.902 | 17.642 | 0.025 | 6.597 |
| DQ 12 | 1.59 | 50.899 | 18.349 | 0.124 | 5.946 |
| DQ 13 | 3.22 | 50.293 | 16.728 | 52.726 | 8.119 |
| DQ 11 | 0.89 | 49.694 | 16.935 | 0.148 | 7.867 |

*FIG. 3A*

| Compound | Dielectric Energy (kcal)/mole) G | Steric Energy (kcal/mole) H | Total Energy (Hartree) I | Heat of Formation (kcal/mole) | HOMO Energy (ev) |
|---|---|---|---|---|---|
| DQ 18 | 7.7 | 39.331 | 214.593 | 258.295 | 13.703 |
| DQ 16 | 7.211 | 39.597 | 221.775 | 242.427 | 13.635 |
| DQ 10 | 6.602 | 40.322 | 236.121 | 218.102 | 13.52 |
| DQ 14 | 8.438 | 39.924 | 205.938 | 291.32 | 13.855 |
| DQ 17 | 7.759 | 50.797 | 329.153 | 171.131 | 12.628 |
| DQ 15 | 7.301 | 49.902 | 336.331 | 155.69 | 12.601 |
| DQ 12 | 6.62 | 50.899 | 350.679 | 131.143 | 12.552 |
| DQ 13 | 8.487 | 50.293 | 320.496 | 204.337 | 12.687 |
| DQ11 | 8.312 | 49.694 | 321.968 | 190.296 | 12.661 |

FIG. 3B

| Compound | Ionization Potential (eV) L | Log P M | LUMO (eV) Energy N | Shape Index (basic kappa, order 3) O | Valence Connectivity Index (order 2, standard) Q | Solvent Accessible Surface Area (Å²) P |
|---|---|---|---|---|---|---|
| DQ18 | 13.703 | 6.409 | -7.127 | 21.031 | 521.24 | 11.069 |
| DQ16 | 13.635 | 6.86 | -6.601 | 22.027 | 539.815 | 11.423 |
| DQ10 | 13.52 | 7.653 | -5.948 | 23.967 | 576.054 | 12.13 |
| DQ14 | 13.855 | 6.179 | -8.122 | 13.04 | 485.397 | 10.53 |
| DQ17 | 12.628 | 12.75 | -7.139 | 36.681 | 813.7 | 16.726 |
| DQ15 | 12.601 | 13.201 | -6.598 | 37.686 | 831.853 | 17.08 |
| DQ12 | 12.552 | 13.993 | 5.946 | 39.658 | 883.721 | 17.787 |
| DQ13 | 12.687 | 12.52 | -8.119 | 26.747 | 778.615 | 16.187 |
| DQ11 | 12.661 | 12.697 | -7.867 | 35.716 | 793.278 | 16.372 |

FIG. 3C

Predictive Eq. for Pd II $B = 0.0554277*E + 0.610452*L - 16.7616/N - 9.0729$

Predictive Eq. for Pd IV $B = 71.6336*D + 0.463796*E + 23.6272*F + 19.8848*G - 9.37422*H + 2.71931*I + 108.256$ Predictive Eq. for Pt II $B = -276.194*L - 69.6714*M - 4.68162*N - 7.67628*O + 3.7778*P - 154.864*Q + 4211.14$ Predictive Eq. for Pt IV $B = 283.378*D + 1.42399*E + 173.825*F + 212.266*G + 2.69479*H + 144354*I + 167.3$ Predictive Eq. for Rh III $B = 0.00584793*E - 0.90334*N - 42.1486/N - 12.3346$

US 7,189,380 B2

EXTRACTION OF METALS WITH DIQUATERNARY AMINES

This application is a continuation-in-part of U.S. application Ser. No. 10/071,872 filed on Feb. 7, 2002, now U.S. Pat. No. 6,890,496 and U.S. application Ser. No. 10/427,028 filed on Apr. 30, 2003.

BACKGROUND OF THE INVENTION

1. Field of the Invention

The present invention relates to an extractant and an extraction process. More particularly, the invention relates to an extractant useful for extracting metal ions.

2. Description of the Related Art

The platinum group metals (PGMs) are exceedingly rare in nature with average crustal quantities of only a few fractions of a part-per-million (ppm). Only a few large deposits of platinum group metals are known to exist and these deposits are located in South Africa and Russia. Smaller quantities of PGMs are obtained from the anode slimes produced during the electrorefining of nickel and from a few small mineral deposits variously located around the world. The growing demand for platinum group metals and other precious metals in high-technology applications has generated a demand for methods and processes for recycling these materials, especially from spent catalysts and from electronic scrap. It is important that PGMs be recycled because of the limited natural supply of these elements.

PGMs are used as catalysts in the chemical and automotive industry and as oxidation resistant coatings in the electronics sector. Many of these uses, especially the catalytic uses, are ideal for recovering the PGMs because the spent catalyst may be easily processed for metal recovery as part of the disposal process for the spent catalysts. Therefore, there is an interest in improving the methods and processes used for recovering PGMs by making these methods and processes faster and more efficient.

Using traditional smelting techniques to treat materials such as spent catalysts or electronic scrap is not always effective due to the refractory nature and low precious metal content of the spent catalysts and electronic scrap. Leaching spent catalysts and other scrap materials with acidic chloride solutions containing an oxidizing agent is effective in removing the precious metals and has the added advantage of preserving valuable substrates for recycling. However, the recovery and subsequent separation of precious metals, including PGMs, from the chloride feed liquors constitutes a difficult problem because these liquors often contain only low levels of precious metals (ppm levels) but high levels (on the order of grams per liter) of base metals such as iron, copper, zinc, tin, and nickel. Moreover, the volumes of solutions generated from the acid recovery of precious metals from spent catalysts and the like are large compared to the volume of highly concentrated solutions generated from typical precious metal refining. Classical precipitation techniques are inefficient when applied to such solutions and these classical techniques are being replaced by modern separation methods such as solvent extraction processes.

Solvent extraction, sometimes referred to as liquid ion exchange extraction, takes place in two steps. In the first step, the extraction step, a dilute aqueous feed solution containing the metal ion to be recovered is mixed with an immiscible hydrocarbon carrier containing an extractant dissolved therein. When the metal ion contacts the extractant, a metal complex is formed that migrates to the organic phase. In the second step, the stripping step, the "loaded" organic phase, which has been separated from the aqueous feed solution, is mixed with another aqueous solution of a stripping agent (e.g., sulfuric acid) wherein the metal ion passes to the aqueous stripping phase. Therefore, the extraction process converts a dilute feed solution of metal ions into a highly concentrated solution of the precious metal ions from which the metals may be more readily recovered, e.g., by electrolysis. The barren organic phase may then be recycled through the system if desired.

Monoquaternary amines have been somewhat effective in recovering platinum group metals from acidic process streams containing base metals such as nickel and cobalt. Monoquaternary amines contain a positively charged nitrogen atom having four groups bonded to the nitrogen atom, and another atom or substituent that neutralizes the positive charge, typically a hydroxide or a chloride. However, the monoquaternary amines currently used in separation processes are not highly selective, although some selectivity has been achieved by modifying the substituent groups on the quaternized nitrogen atom or by carefully selecting the organic solvent used as a diluent. A monoquaternary amine currently being used in extracting PGMs is N-methyl-N,N-dioctyl-1-octanaminium chloride. (Available as ALIQUAT 336, a registered trademark of the Henkel Corporation of Germany).

In extracting PGMs from an aqueous acidic solution using a monoquaternary amine, the monoquaternary amine is first dissolved in a predominately water-immiscible or organic phase, such as 1-octanol. The aqueous and the organic solutions are then intimately mixed to allow the dissolved quaternary amine salt to form an ion pair with the PGM and transfer the desired PGM species from the aqueous phase into the organic phase. The two phases can then be separated and the extracted anion recovered from the organic phase.

A monoquaternary amine has also been adsorbed onto an inert polymeric support, while still retaining its desirable anion exchange properties, by making a slurry of the quaternary amine in methanol with resin beads and slowly removing the methanol using a rotary evaporator, leaving the monoquaternary amine adsorbed onto the surface of the resin beads. Since the monoquaternary amine is not covalently attached, but only held by weak Van der Waals attractions, the selectivity in extracting PGMs is similar to that of the free monoquaternary amine. In extraction systems, it is preferable for the extractant to be immobilized on a solid support because it eliminates the organic solvent, thereby making processing simpler with fewer environmental concerns.

What is needed is a more selective extractant compound for extracting precious metals, such as PGMs, from acidic solutions. It would be an advantage to provide a method for designing an efficient extraction compound having a high selectivity for a particular precious metal.

SUMMARY OF THE INVENTION

One embodiment of the present invention provides a method for selectively extracting one or more metal anions from an aqueous solution, the method comprising contacting the aqueous solution with an organic solution including a diquaternary amine, wherein the diquaternary amine has two diquaternary nitrogens spaced at a distance of less than about 10 Å, selectively binding the metal anions to the diquaternary amine; and then separating the organic solution from the aqueous solution, wherein the diquaternary amines having the selectively bound metal anions are concentrated in the organic solution.

The method may be used to extract one or more platinum group metals, preferably platinum, palladium, rhodium, and combinations thereof. The diquaternary amines are selective and may selectively extract desired metals from an aqueous solution containing the desired metal anions as well as contaminant metals. The contaminant metals may be, for example, selected from Pb, Al, Ba, Ce, Zr, Fe, Cu, Co, Ni, Mo, Sn, Sb, As, Bi, Zn, Na, K, Ca and combinations thereof. Examples of valuable metals that the diquaternary amines may selectively extract are selected from Ag, Au, Pd, Rh, Pt, Ru, Os, Ir, and combinations thereof. Preferably, the diquaternary amines are used to selectively extract one or more metal anion complex, wherein the distance between the two diquaternary nitrogens allows both diquaternary nitrogens to simultaneously interact with the one or more metal anion complex. In other words, the one or more metal anion complex that has been targeted to be selectively extracted should have a size compatible with forming a complex between both diquaternary nitrogens. It is believed that this simultaneous interaction or complexing occurs when the distance between the two diquaternary nitrogens is within about 5 Angstroms of the size of the complex, either greater or smaller.

The method is not limited to any particular pH of the aqueous solution, but metals are typically dissolved in acidic solutions. These acidic aqueous solutions may contain an acid selected from hydrochloric acid, sulfuric acid, nitric acid, any other acid that may dissolve the metals to be extracted, and combinations thereof. The acid concentration may be of any concentration that dissolves the metal anions to be extracted. The diquaternary amines effectively extract valuable metals at any acid concentration. However, it should be emphasized that an important advantage of the present invention is that any solution that contains dissolved metals to be extracted is suitable for the method of the present invention, whether the solution is a base solution, a neutral solution or an acidic solution.

The aqueous solution is contacted with the organic solution for a time period suitable of less than about 30 minutes, preferably less than about 20 minutes, and more preferably between about 5 minutes and about 20 minutes.

The concentration of the diquaternary amines within the organic solution is any concentration up to saturation, preferably between about 0.5 wt % and about 10 wt %, more preferably between about 0.5 wt % and about 6 wt %, and most preferably between about 1 wt % and about 5 wt %. Preferably there is a molar excess of diquaternary amines in the organic solution over the amount of metal anion to be extracted. The organic solution has an organic solvent able to dissolve the selected one or more diquats and is immiscible with water, preferably selected from chloroform, 1-octanol, methanol, and combinations thereof.

The diquaternary amines are diquaternary ammonium halides that are substantially insoluble in water. The diquaternary amines must provide a distance between the two diquaternary nitrogens that allows the formation of a complex between both diquaternary nitrogens and the one or more metal anion complex to be selectively extracted. This complex between the diquaternary nitrogens and one or more metal anion complex may be formed when the two diquaternary nitrogens are separated by a structure including, without limitation, an alkyl chain that may be either saturated or unsaturated and either straight or branched, or a heterocyclic ring structure that may be either saturated or unsaturated and either substituted or unsubstituted. In the simplest embodiments, the structure that links the two diquaternary nitrogens will having from about 2 to about 8 carbon atoms separating the two diquaternary nitrogens, although additional carbon atoms may be present in sides chains or portions of the ring structure that do not affect the spacing of the nitrogens. It is the spacing of the two diquaternary nitrogens that is most important, and the foregoing structures between the two diquaternary nitrogens should be construed to include all possible hydrocarbon structures. While the halogen may be fluorine, chlorine, bromine or iodine, the halogen is preferably selected from iodine and chlorine.

The methods of the present invention are not limited to dissolving the diquaternary amine in an organic solvent. Alternatively, the diquaternary amines may be immobilized on a solid surface, such as a resin or a polymer. In this embodiment, the aqueous solution is mixed or flows over the solid phase having the attached diquaternary amines, wherein the diquaternary amines extract the metal anions from the aqueous solution. The diquaternary amines may be bonded to the solid surface by adsorption or by chemical bonding.

Another embodiment of the present invention provides a method for selectively extracting palladium from an aqueous solution. The method comprises contacting the aqueous solution with an iodide and an organic solvent, allowing the palladium to bind to the iodide, and then separating the organic solution from the aqueous solution, wherein the KI having the bound palladium ions are concentrated in the organic solution.

Yet another embodiment of the present invention further provides a method for first selectively extracting palladium from a mixture of metal anions with an iodide and then selectively extracting other metal anions with the diquaternary amines. The method comprises dissolving the metals into an acidic solution, contacting the acidic solution with an iodide, separating the iodide from the acidic solution, wherein the Pd is bound to the iodide, contacting the acidic solution with an organic solution including a diquaternary amine, wherein the distance between two diquaternary nitrogens is less than about 10 Å, selectively binding the Pt anions to the diquaternary amine, and then separating the organic solution from the aqueous solution, wherein the diquaternary amines having the selectively bound Pt anions are concentrated in the organic solution. The iodide may be either an organic iodide, such as a diquaternary amine iodide, or an inorganic iodide, such as potassium iodide.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIG. 3A–3C is a table showing the calculated values for different properties of the synthesized diquaternary amines.

DETAILED DESCRIPTION OF A PREFERRED EMBODIMENT

Figure 1:
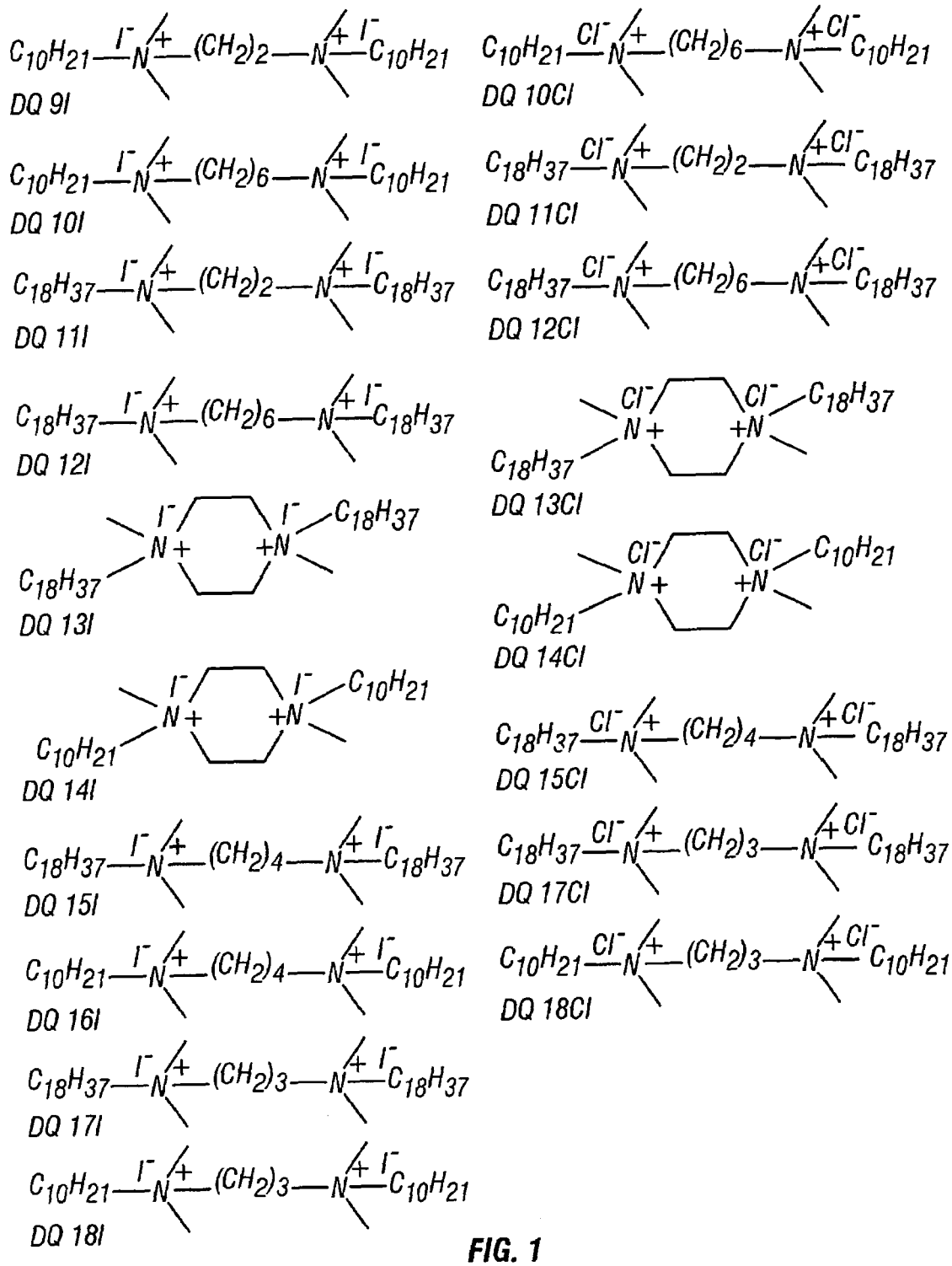
FIG. 1 shows the structures of the diquaternary amines that were synthesized.

One embodiment of the present invention provides a method for using diquaternary amine compounds or extractants to extract anions of platinum group metals and other metals from an aqueous solution. The diquaternary amine compounds have tailor-made properties that enhance their ability to extract platinum group metals and other metals from aqueous solutions. Platinum group metals (PGM) include platinum, palladium, rhodium, iridium, ruthenium and osmium. The interaction between the diquaternary amines of the present invention and the metal anions is specific based upon a favorable spatial arrangement so that the metal anions may be trapped selectively, providing a strong interaction that traps the metal anion as a stable pair.

The strong interaction and the favorable spatial arrangement provided by the diquaternary amines of the present invention are achieved by linking two quaternary amines together with a short aliphatic carbon chain or a small ring, thereby forming a diquaternary amine compound that provides a strong interaction and the favorable spatial arrangement with the target metal anion. Optionally, it should be noted that the chain or the ring may be saturated or unsaturated. By changing the length or size of the chain or ring between the amines, different diquaternary amine compounds may be synthesized having desired spatial arrangements, because the longer the chain or the larger the ring, the farther apart will be the two nitrogens in the resulting diquaternary amine. Therefore, to extract a larger anion, a diquaternary amine may be designed having a longer chain or a larger ring. To extract an anion having a smaller size, a diquaternary amine may be designed having a shorter chain or a reduced ring size. Because the diquaternary amine "grips" the metal complex anion between the two nitrogen atoms, if the anion is significantly smaller than the space between the nitrogens, then the anion will not be selectively extracted because the anion is not large enough to be attracted by both nitrogen atoms at the same time, but only by the lesser attraction of whichever one is closer. Conversely, if the metal anion complex size is much larger than the space between the nitrogens, then the metal anion complex may be less selectively extracted since the anion will not be attracted strongly between the nitrogen atoms. However, because the larger-size anion may still interact with both nitrogen atoms, some selectivity seems to be retained so long as the size of the metal anion complex can still interact with both of the nitrogens of the diquaternary amine. The spatial characteristics of the distance between the two positively charged nitrogen ions thereby leads to a degree of shape and/or size selectivity for specific anions.

The distance between the two quaternary nitrogens does not decrease linearly with the decrease in the number of methylene groups separating them. The distance between two quaternary nitrogens separated by five methylene groups was found to be 7.55 Å decreasing to 3.57 Å with only two methylene groups. The distance was found to be 3.03 Å with a cyclical piperazine derivative. The distance between the nitrogens also changed as a function of the substituent around the nitrogen. In comparison, the average ionic size of the platinum metal halide compounds has been predicted to be about 3 Å.

The diquaternary amines used as extractants in the present invention were synthesized by combining tertiary diamines with a stoichiometric molar excess of alkyl halides to produce diquaternary ammonium halides. The preferred alkyl halides are the alkyl chlorides, such as 1-Chloro octadecane or 1-Chlorodecane, or the alkyl iodides, such as 1-Iodo octadecane or 1-Iododecane. The alkyl halides should be selected to ensure that the diquaternary amines have low water solubility, such as an alkyl halide having ten carbon atoms. If the starting tertiary diamines already have low water solubility, or if the extraction process does not require the diquaternary amine to be dissolved in an organic phase to facilitate separation from the aqueous phase during the extraction process, then other alkyl halides with fewer carbon atoms would be suitable. However, in the examples disclosed herein, water insolubility of the diquaternary amine is ensured by including an alkyl halide with an alkyl group having at least ten carbon atoms.

Exemplary diquaternary ammonium halides may be prepared by the following synthesizing schemes:

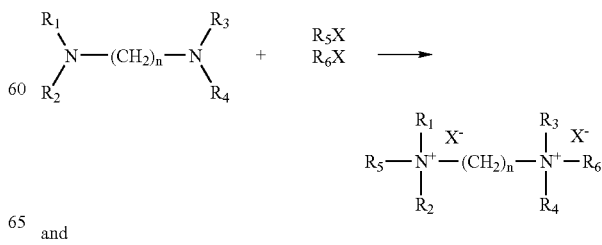

and

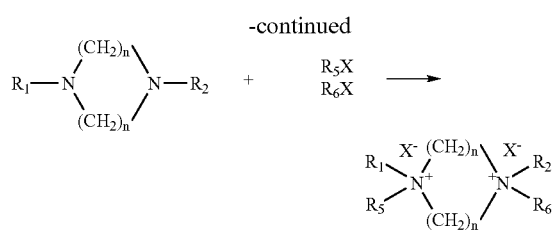

wherein $R_1$–$R_6$ are each independently selected from hydrogen and organic groups, and wherein n is an integer from 2 to about 8. Aromatic diquaternary amines would be similarly synthesized. In accordance with the invention, the chain between the two diquaternary ammoniums may be either saturated or unsaturated and either straight or branched, or the ring between the two diquaternary ammoniums may be either saturated or unsaturated and either substituted or unsubstituted.

The prepared diquaternary amine salts were precipitated as white crystalline solids. Some of the solid diquaternary amines were stored in capped vials in a lab room at room temperature for up to six months. No degradation or decomposition was observed during these six months nor was the extracting ability of the stored diquaternary amines affected when compared with freshly prepared compounds. The diquaternary amines of the present invention therefore appear to be very stable compounds that can be stored for long periods of time without degrading.

The diquaternary amines thus synthesized are useful for extracting platinum group metals and other precious/valuable metals from aqueous solutions, preferably acidic solutions, wherein the metals form an anion complex. The method is not limited only to extracting metals from acidic solutions, but from extracting metal anions from any aqueous solution having any pH. The extraction method comprises contacting the aqueous solution with the diquaternary amines so that the metals may come into contact with the diquaternary amines, wherein a complex is formed between the diquaternary amine and the metal. In effect, the complex allows the diquaternary amine to "capture" or extract the metal from the aqueous solution. After the aqueous solution has contacted the diquaternary amine for a sufficient time, a separation step is required wherein the aqueous solution is separated from the diquaternary amine, leaving the metals with the diquaternary amine. If the diquaternary amine is dissolved in an organic solvent that is not miscible with water, then the separation is achieved by separating the aqueous solution from the immiscible organic solution.

Alternatively, the diquaternary amine may be immobilized on a resin or other surface of an inert substrate or polymer, wherein the separation step involves separating the aqueous solution from a solid phase having a surface on which the diquaternary amines are either adsorbed or chemically bonded. The diquaternary amines may be adsorbed onto the surface as described above for a monoquaternary amine or chemically bonded to a resin bead or similar inert substrate or polymer by including a specially functionalized substituent in the diquaternary amine that can chemically bond to a polymer backbone during polymerization or be chemically attached later on to the inert substrate. For example, in synthesizing the diquaternary amine, the substituent added to the tertiary amines to synthesize the diquaternary amine may include an additional active substituent, such that after the diquaternary amine is synthesized, the active substituent may be brought into contact with a polymer and then bind itself to the polymer under favorable reaction conditions.

When the diquaternary amine is dissolved in an organic solvent to facilitate the separation step of the extraction method, any organic solvent that is immiscible with water would be suitable. A preferred organic solvent is 1-octanol for most of the diquaternary amines. However, to improve the solubility for some of the diquaternary amines in 1-octanol, the addition of chloroform and/or methanol is helpful. A more preferred organic solvent is chloroform because using chloroform as the solvent improves the extraction of the precious metals from the aqueous solution. Table 1 presents a table showing the effect of solvent selection on the extraction of rhodium and platinum using selected diquaternary amines. Organic solutions of the diquaternary amines may have concentrations up to saturation, preferably up to about 10 wt % diquaternary amines. More preferably, the concentrations will range from 0.5 wt % to about 5 wt %. Most preferably, the concentrations will range from about 1 wt % to about 5 wt %.

TABLE 1

| DQ ID | Chloroform | Octanol |
|---|---|---|
| Percent Rh III Removed from a 3 M HCl Solution | | |
| 9 I | 88.35 | 63.92 |
| 11 I | 87.48 | 63.40 |
| 17 I | 87.00 | 59.73 |
| Percent Pt III Removed from a 3 M HCl Solvent | | |
| 10 Cl | 98.46 | 89.50 |
| 11 Cl | 96.77 | 53.56 |
| 12 Cl | 91.42 | 77.14 |
| 13 Cl | 98.14 | 99.86 |
| 14 Cl | 99.45 | 97.61 |

The required contact time between the diquaternary amine and the aqueous solution during the extraction process is determined by the kinetics of the extraction process. It is desirable to carry out an extraction process in as short a time period as possible to minimize the operating costs. In the method of the present invention, contact time may be less than 30 minutes, preferably less than 20 minutes, and most preferably between about 5 minutes and about 20 minutes.

The metals that may be extracted using this method include platinum group metals and other precious metals. The metals include, for example, platinum, palladium, rhodium, iridium, osmium, ruthenium, gold, silver and combinations thereof. However, the method of the present invention is not limited only to these metal anion complexes but may be used to extract any desired metal anion complex that is attracted to the diquaternary nitrogen atoms and that has an anion complex size similar to the distance between the two diquaternary nitrogen atoms.

Recovering precious metals from spent catalysts, electronic scrap and other similar sources include mixing these precious metal-containing materials with a strong acid, such as sulfuric acid, nitric acid and/or hydrochloric acid to dissolve the metals into an aqueous acidic solution from which the metals may be extracted through an extraction process. While traditionally these metals are dissolved in acidic solutions, the present method is not limited to recovering metal anion complexes only from acidic solutions, but from an aqueous solution having any pH. The resulting acidic solutions containing the precious metals to be extracted will also contain contaminant metals and other materials dissolved by the acid from the spent catalyst and electronic scrap. These contaminant metals often have a higher concentration level in the acidic solution than the desired precious metals, and may include Pb, Al, Ba, Ce, Zr, Fe, Cu, Co, Ni, Mo, Sn, Sb, As, Bi, Zn, Na, K, Ca and combinations thereof.

Figure 2:
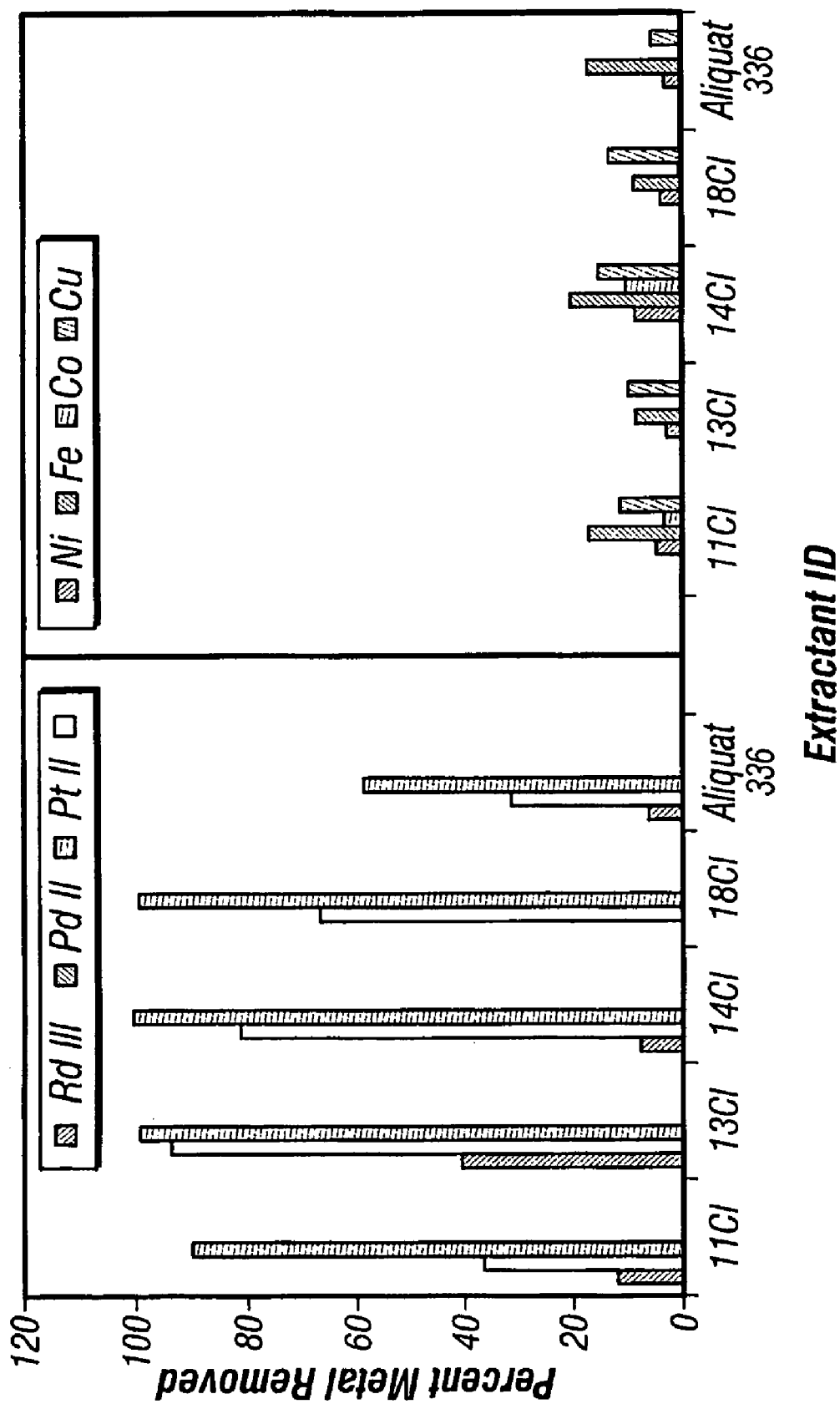
FIG. 2 is a graph showing the percent metal extracted from an aqueous solution containing Rh, Pd, Ni, Fe, Co, and Cu for selected extractants.
Figure 4A:
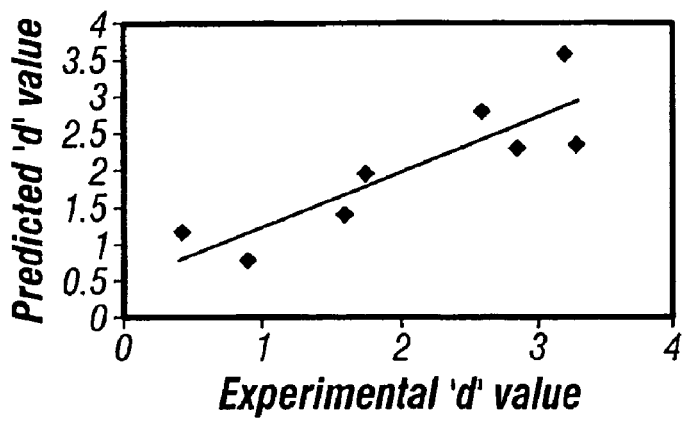
FIGS. 4A–4E are graphs of equations that may be used to predict selectivity of structurally related diquaternary amines for Pd II, Pd IV, Pt II, Pt IV and Rh III.
Figure 4B:
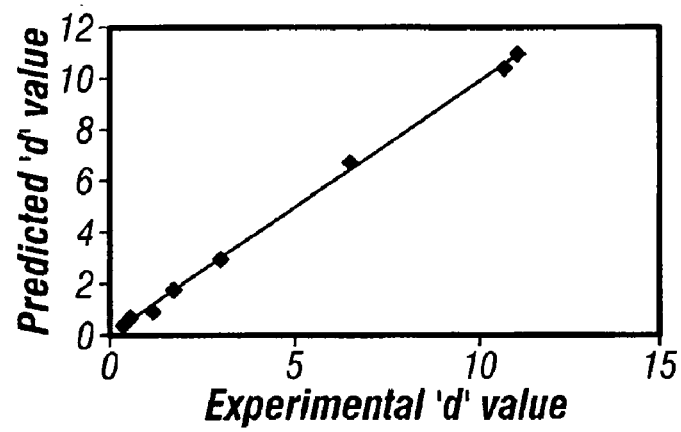
Figure 4C:
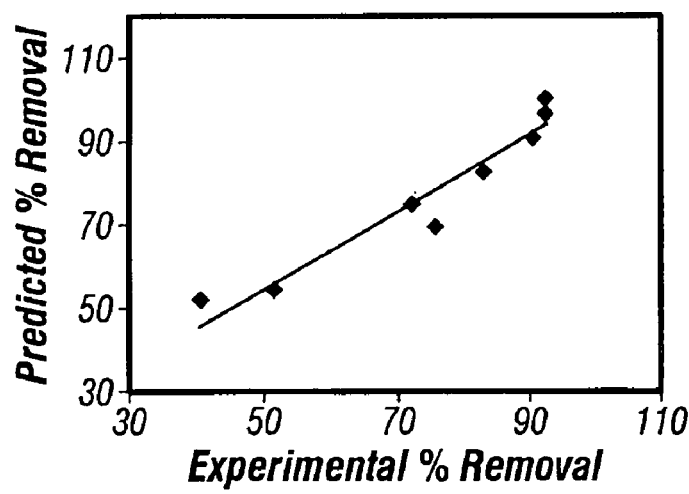
Figure 4D:
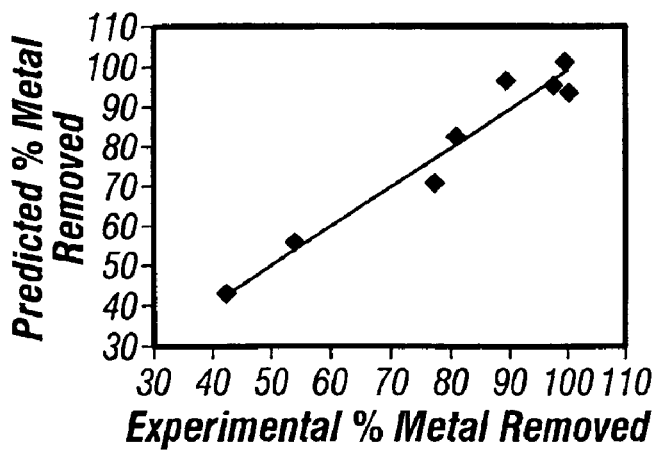
Figure 4E:
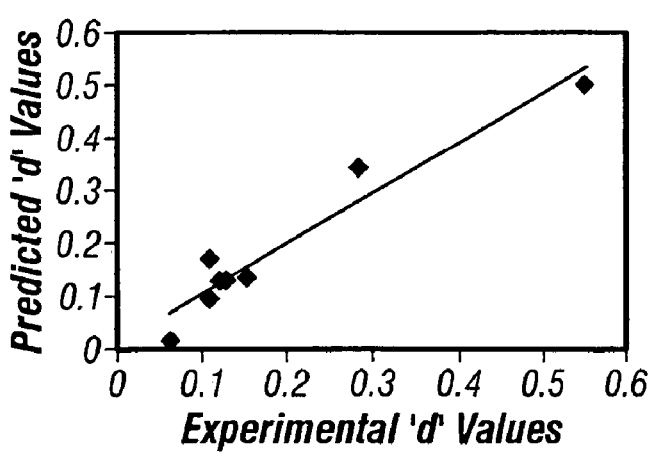

Selected diquaternary amines have shown good selectivity between the contaminant metals and the precious metals when tested in aqueous solutions containing Rh, Pd, Ni, Fe, Co, and Cu. FIG. 2 is a graph showing the percent metal extracted from an aqueous solution containing Rh, Pd, Ni, Fe, Co, and Cu for different selected diquaternary amines of the present invention, as well as the commercially available monoquaternary amine ALIQUAT 336. The metals were extracted from a 3 M hydrochloric acid (HCl) solution containing 50 ppm of each of the metal components using organic solutions having the selected diquaternary amines in concentrations of 2.5 wt %.

The acidity of the aqueous solution may affect the efficacy of the extraction process when using the diquaternary amines. In the case of platinum and rhodium, it has been found that a wide range of acidity is acceptable for the diquaternary amines to extract the metal, with some diquaternary amines performing better than others for a given acidity. A lower acidity is preferred for extracting palladium. Tables 2 through 4 show the effect that the acidity of the aqueous solution has on the ability of selected diquaternary amines to extract platinum, palladium and rhodium. Table 2 shows the effect of differing acid concentrations on the performance of selected diquaternary amines in extracting Pd II and Pd IV from a 50 ppm solution of the metal. Table 3 shows the effect of differing acid concentrations on the performance of selected diquaternary amines in extracting Pt II and Pt IV from a 50 ppm solution of the metal. Table 4 shows the effect of differing acid concentrations on the performance of selected diquaternary amines in extracting Rh III from a 50 ppm solution of the metal.

TABLE 2

| Diquat ID | 0.5 M HCl Pd II | 3 M HCl Pd II | 10 M HCl Pd II | 0.5 M HCl Pd IV | 3 M HCl Pd IV | 10 M HCl Pd IV |
| --- | --- | --- | --- | --- | --- | --- |
| 10 Cl | NA | 63.62 | 25.66 | 99.46 | 86.48 | 28.29 |
| 13 Cl | 63.22 | 76.31 | 39.16 | 98.00 | 91.69 | 35.55 |
| 14 Cl | 98.54 | 72.25 | 55.27 | 99.11 | 74.75 | 51.20 |
| 18 Cl | 99.68 | 74.06 | 53.87 | 99.76 | 91.39 | 49.21 |
| Aliquat 336 | 85.22 | 27.25 | 49.93 | 77.87 | 28.52 | 34.27 |

TABLE 3

| Diquat ID | 0.5 M HCl Pt II | 3 M HCl Pt II | 10 M HCl Pt II | 0.5 M HCl Pt IV | 3 M HCl Pt IV | 10 M HCl Pt IV |
| --- | --- | --- | --- | --- | --- | --- |
| 10 Cl | 99.82 | 89.50 | 99.82 | 98.91 | 97.45 | 98.91 |
| 13 Cl | 99.80 | 99.86 | 99.80 | 100.00 | 100.00 | 100.00 |
| 14 Cl | 100.00 | 97.61 | 100.00 | 100.00 | 100.00 | 100.00 |
| 18 Cl | 100.00 | 100.00 | 100.00 | 100.00 | 97.65 | 100.00 |
| Aliquat 336 | 96.82 | 46.25 | 96.82 | 86.21 | 63.54 | 86.21 |

TABLE 4

| Diquat ID | 0.5 M HCl Rh III | 3 M HCl Rh III | 10 M HCl Rh III |
| --- | --- | --- | --- |
| 11 Cl | 2.85 | 12.99 | 12.28 |
| 13 Cl | 24.54 | 35.61 | 20.04 |
| 14 Cl | 14.70 | 22.05 | 30.84 |
| 18 Cl | 0.0 | 9.64 | 11.50 |
| Aliquat 336 | 2.77 | 0.00 | 0.00 |

Not all diquaternary amines are equally effective in extracting a given precious metal from an aqueous solution. Table 5 illustrates the metal anion selectivity demonstrated by selected diquaternary chloride amines in extracting metal anion complexes from an aqueous solution containing equal concentrations of the extracted metals. As shown in Table 5, the diquaternary amines were most effective in extracting Pt, with Pd being the next most successful metal to be extracted. Rhodium was the least successful to be extracted. However, it should be noted that the diquaternary amines having a distance of 3.03 Å, 3.10 Å, 5.21 Å, and 5.36 Å between the two nitrogens performed best in extracting the metal halide compounds, having an estimated size of about 3 Å. This supports the present conclusion that the performance of the diquaternary amines in extracting metals from an aqueous solution depends on the distance between the nitrogens. Therefore, diquaternary amines may be designed to extract metals from a solution based upon the size of the metal to be extracted.

TABLE 5

| Diquat ID | N Spacing Å | Rh % Extracted | Pt % Extracted | Pd % Extracted |
| --- | --- | --- | --- | --- |
| 10 Cl | 8.3 | 0 | 86 | 76.62 |
| 11 Cl | 3.68 | 0 | 61.64 | 41.26 |
| 12 Cl | 8.6 | 0 | 53.31 | 53.02 |
| 13 Cl | 3.03 | 21.94 | 100 | 95.67 |
| 14 Cl | 3.10 | 1.95 | 100 | 88.00 |
| 15 Cl | 0.66 | 0 | 38.49 | 26.49 |
| 17 Cl | 5.21 | 1.12 | 92.83 | 56.46 |
| 18 Cl | 5.36 | 0 | 98.63 | 80.71 |
| Aliquat 336 | | 0 | 39.01 | 30.05 |

As may be seen from Table 6, the diquaternary iodides are much better extractants for rhodium than the diquaternary chlorides.

TABLE 6

| | Diquat ID | | | | | | | | | | |
|---|---|---|---|---|---|---|---|---|---|---|---|
| | 9 I | 10 I | 11 I | 12 I | 13 I | 14 I | 15 I | 16 I | 17 I | 18 I | Aliquat 336 |
| Rh III % Extracted | 88 | 47 | 87 | 50 | 86 | 71 | 64 | 69.7 | 87 | 57 | 30 |

The inventors have also discovered that iodide ions form a complex with the Pd ions in the aqueous acidic solution, rendering the Pd-iodide complex highly soluble in organic solvents. Therefore, Pd may be removed from an acidic aqueous solution simply with the addition of an iodide ion, such as provided by KI dissolved in a solvent such as octanol or chloroform. By adding the iodide, the palladium ions migrate to the organic phase from the aqueous phase, thereby providing an important tool for the separation of Pd from other precious and contaminant metals. The KI may be added to the aqueous solution or to the organic solvent used to recover the palladium, but preferably to the aqueous solution. Other inorganic or organic iodides are acceptable such as NaI, CaI, MgI, monoquaternary amine iododies, alkyl iodides and other organo iodides. The iodide concentration in the solvent is not critical but there should be a molar excess to the metal complex anion. The organic solvent may be any organic solvent that dissolves the metal iodide and is immiscible in water. Contact time should be between less than about 45 minutes, preferably between about 5 minutes and about 30 minutes.

A two step process for selectively extracting precious metals from spent catalyst taken from automobile catalytic converters is beneficial. Platinum and palladium are both used in catalytic converters and may be selectively extracted from an acidic solution containing these metals by using a two step process of the present invention. First, the palladium is removed by contacting the acidic solution with an iodide as described above. After separating the organic solution containing the palladium, the acidic solution is contacted with a second organic solution containing a diquaternary amine that selectively extracts the platinum.

Extracting palladium first by using iodide is beneficial because it allows the diquaternary amines to be used for extracting only the platinum. This provides a separation technique not only for extracting the precious metals from the contaminant metals, but also for obtaining the palladium separate from the platinum.

Quantitative Structure Activity Relationship (QSAR) analysis was used on the synthesized diquaternary amines to determine whether there was a predictive relationship for determining whether a particular diquaternary amine, having a given carbon chain length, would be successful as an extractant for specific precious metal ions. The experimental data obtained for the 10 synthesized diquaternary amines was used to determine a quantitative relationship between the binding abilities of various diquaternary amines and their structural properties. The quantitative relationships derived herein from the limited experimental data available is not meant to be definitive, but demonstrates a method that may be used to design a particular diquaternary amine suitable for selectively extracting a given metal anion complex or group of metal anion complexes.

This quantitative relationship may be used to predict whether a given diquaternary amine would be a good extractant for a particular metal anion. To determine the quantitative relationship, various chemical, physical, topological and electronic descriptors are first calculated using empirical equations based upon the structure of the compound. Fifteen different properties were calculated with the results shown in FIG. 3A–3C.

Next, the experimental values from the solvent extraction experiments were converted into distribution ratios, or D Values. The D Values represent the ratio of the amount of metal ion concentration extracted in the organic phase versus the amount of metal ion concentration remaining in the aqueous phase, as defined by:

$$D=[PGM]_{org}/[PGM]_{aq}$$

Next, these D Values were plotted as experimental D Values on graphs as shown in FIGS. 4A through 4E. Correlations between the calculated properties shown in FIG. 3 and the D Values were determined and analyzed by viewing scatter plots. The properties that gave the best fits were used to generate multiple regression analysis columns. The resulting equations may be used to predict selectivity of structurally related diquaternary amines for future research and applications. FIGS. 4A through 4E further show the prediction equations for Pd II, Pd IV, Pt II, Pt IV and Rh III.

EXAMPLE 1

Synthesis of Diquats

Ten diquaternary iodide amines and eight diquaternary chloride amines were synthesized in accordance with the present invention. Each of the synthesized diamines was synthesized from one of the following five different diamines: N,N,N,N-Tetramethylethylenediamine (TMED), N,N,N',N'-Tetramethyl-1,4-butanediamine (TMBD), N,N,N',N'-Tetramethyl-1,3-propanediamine (TMPD), N,N,N',N'-Tetramethyl-1,6-hexanediamine (TMHD), or 1-4-Dimethylpiperazine (DMP). To synthesize one of the diquaternary amines, 10 mM (millimoles) of a diamine selected from those listed above, was added to 25 ml of dimethyl formamide in a 200 ml round bottom flask. An alkyl halide was added to this solution at a molar excess of either 4 times or 6 times the stoichiometric requirement. For a stoichiometric molar excess of 4 times, 40 mM of 1-chloro octadecane (COD) or 1-iodo octadecane (IOD) was added. For a stoichiometric molar excess of 6 times, 60 mM of 1-chlorodecane (CD) or 1-iododecane (ID) was added. Then 0.2 g of sodium carbonate was added along with a stir bar.

The flask was then placed in a heated oil bath and magnetically stirred. The oil bath was maintained at 75° C. for the synthesis of iodide diquats and 115° C. for the synthesis of chloride diquats. The flask was capped with a 20° C. water-cooled reflux condenser, sealed with a rubber septum and vented with a syringe needle. The reaction mixture was then sparged with argon, heated, and stirred for 48 hours.

Synthesized iodide diquaternary amines were precipitated by the drop wise addition of the reaction mixtures in 100 ml of benzene while the synthesized chlorides were precipitated in a 50 ml:50 ml mixture of hexanes-benzene. The solutions were then kept cooled to −15° C. overnight. Precipitates were isolated by vacuum filtration on medium fine filter paper, washed with an additional 20 ml of respective solvent and then vacuum dried overnight. Products were weighed, sealed in glass vials, labeled and stored at 5° C. until further use. Yields of the diquats were nearly quantitative and the overall yields of iodide diquats were higher than those of the chlorides. Two of the chloride diquats, referred to in FIG. 1 as 9 Cl and 16Cl, were unable to be precipitated out using these procedures. The diquaternary amines synthesized by this method are shown in FIG. 1. The identification numbers used to refer to the diquaternary amines in FIG. 1 was adopted for convenience and has no relevance to the actual structure of the diquats, except that "Cl" refers to the chloride form of the diquat (abbreviated "DQ") and "I" refers to the iodide form of the diquat.

EXAMPLE 2

Effect of Acid Strength on Extraction Efficiency.

Selected diquaternary amines were used to extract PGMs from solutions of varying acidity to determine the effect of the PGM solution's acid strength on the efficacy of the extraction. Eight solutions were mixed, each containing a selected diquaternary amine dissolved in a mixture of octanol and chloroform at a concentration of 2.5 wt %. Acidic solutions of varying HCL molarity were mixed, each solution containing 50 ppm of one of the following metals: Pd II, Pd IV, Pt II, Pt IV, and Rh III. The HCL acid molarities were 0.5 M HCl, 3 M HCl, and 10 M HCl.

For each of the selected diquaternary amines, the extraction procedure involved contacting 5 ml of the 2.5% diquaternary amine solution with 5 ml of one of the acidic mixtures of the PGMs in a 20 ml glass scintillation vial for 30 minutes with vigorous shaking. Phase separation was aided by centrifuging the mixture at 2500 rpm for three minutes. Using a Pasteur pipet, the aqueous phase was then removed, placed in another scintillation vial, and washed by contacting with 10 ml of chloroform (1 aqueous:2 organic) for one minute with vigorous shaking. Phase separation was again aided by centrifugation and the aqueous phase was removed, the volume determined, and then analyzed for residual PGM metal concentration determination. Rh and Pd concentrations were determined by Atomic Absorption Spectrometry and Pt concentrations by Inductively Coupled Plasma Atomic Emissions Spectrometry. The concentration of metal extracted by the diquaternary amines into the organic phase was assumed to be the difference between the aqueous phases before and after extraction.

The results, shown as percent of PGMs extracted, are shown in Tables 2–4. As can be seen from Table 2, the selected diquaternary amines were significantly better able to extract Pd II and Pd IV from the 0.5 M HCl solution than from the higher molarity solutions. As shown in Table 3, the selected diquaternary amines were each highly successful in extracting the Pt II and Pt IV from all the varying acid molarity solutions. However, as shown in Table 4, only two of the selected diquaternary amines, 13Cl and 14 Cl, were successful in extracting a significant amount of Rh III from all the various acid molarity solutions.

The experiment also analyzed, as shown in each of Tables 2–4, the performance of ALIQUAT 336 in extracting anions at differing acidity. ALIQUAT 336 is a monoquaternary amine that is used commercially to extract metals from an aqueous solution. In every case, the diquaternary amines performed significantly better than ALIQUAT 336. Especially in the case of extracting rhodium, selected diquaternary amines extracted from 22% to 30% of the rhodium present in the aqueous acidic solutions while ALIQUAT 336 only extracted from 0% to 3%. The results of this experiment show that by selecting a particular diquaternary amine as an extractant for a given acidity solution, significantly greater amounts of valuable metals may be extracted from the solutions than using traditional extractants.

EXAMPLE 3

Selectivity of Selected Diquats.

Experiments were conducted using selected diquaternary amines contacted with acidic solutions of PGMs to determine the relative selectivity of selected diquaternary amines towards individual PGMs. An acidic solution containing all three of the PGMs was prepared with the solution containing 50 ppm each of Rh, Pd, and Pt. Using the extraction technique described in Example 2, 2.5% solutions of the selected diquaternary amines, dissolved in either chloroform, 1-octanol or a mixture of the two, were each contacted with the prepared PGM solution. The results are shown in Table 5. The diquaternary amines were shown to be most effective when extracting Pt.

As shown in Table 5, four out of the eight diquaternary amines showed promising performance towards both Pt and Pd metals, but the best performance was obtained with 13Cl and 14Cl. This fits with the theory that the performance of the diquaternary amines depends upon the number of methylenes, and hence the distance, between the two quaternary nitrogens. As shown in Table 5, for diquaternary amines 13Cl and 14Cl, the distance between the quaternary nitrogens is about 3 Å. It should be noted that the average ionic size of the metal halide compounds has been calculated to be approximately 3 Å, thereby verifying that the diquaternary nitrogen spacing is responsible for causing 13Cl and 14Cl to be the best performers.

Again, as in the last example, ALIQUAT 336 was included as an extractant for analysis and comparison between the performance of ALIQUAT 336, the monoquaternary amine currently used to extract metals, and the diquaternary amines used as described in the present invention. As may be seen in Table 5, selected diquaternary amines extracted significantly more rhodium, platinum and palladium than the ALIQUAT 336 was able to extract.

EXAMPLE 4

Extraction of PGMs.

A catalytic converter from a car made in the United States was obtained from a junkyard. The converter was opened with a chop saw and two monoliths were removed. The back monolith was chopped into pieces and about 203 g of this material was contacted with 375 ml of concentrated HCL in a two-liter beaker. About 500 ml of water was added to cover the material completely and then heated to 50° C. for one hour. The solution was allowed to stand overnight, and then filtered to remove the particulates.

Figure 5:
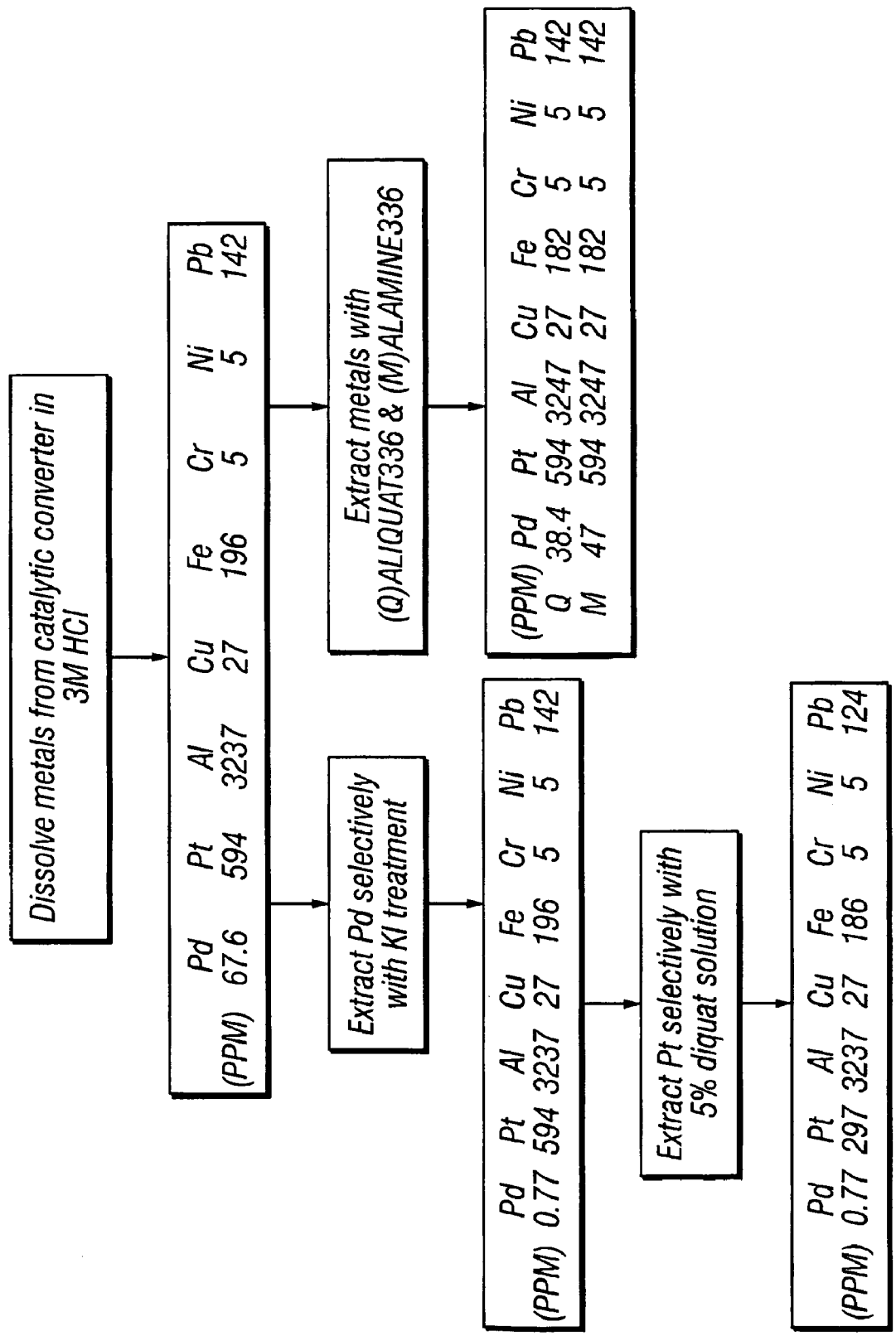
FIG. 5 is a chart showing the metal concentrations at different stages of a metal recovery experiment using an embodiment of the metal recovery method of the present invention.

The solution was analyzed to determine the concentrations of the metal ions present in the solution. The initial concentration of each of the metals is shown in FIG. 5. The acid molarity of the solution was estimated to be 3 M.

To remove the Pd from the solution, 120 ml of a solution made up of octanol and 0.024 g KI, was contacted with the acid solution for 30 minutes. After phase separation, four 10 ml portions were formed from the aqueous phase, the remainder being submitted for analysis. Each portion was separately contacted, by the extraction technique described in Example 2, with 10 ml of three different extractants: a 5% solution of the 13Cl diquaternary amine, a solution of ALIQUAT 336 and a solution of ALAMINE 336. (ALIQUAT 336 and ALAMINE 336 are both registered trademarks of the Henkel Corporation of Germany). After phase separation, the aqueous phases were removed and submitted for Pt and Pd analysis. The organic phases were treated with sodium borohydride to recover the extracted metals. The results are shown in FIG. 5.

As can be seen in FIG. 5, the addition of the KI resulted in the removal of 98% of the Pd from the solution. In the next step, extraction with a 5% diquaternary amine in solution with octanol/chloroform selectively removed about 50% of the Pt from the solution. The other contaminant metals present in the solution, in large excess over the PGMs, were mostly unchanged. By comparison, the commercial products traditionally used to extract metals from acidic solutions were only able to extract a small quantity of the Pd from the solution, while Pt was not extracted at all.

EXAMPLE 5

Scaling up Diquat Synthesis.

Figure 6:
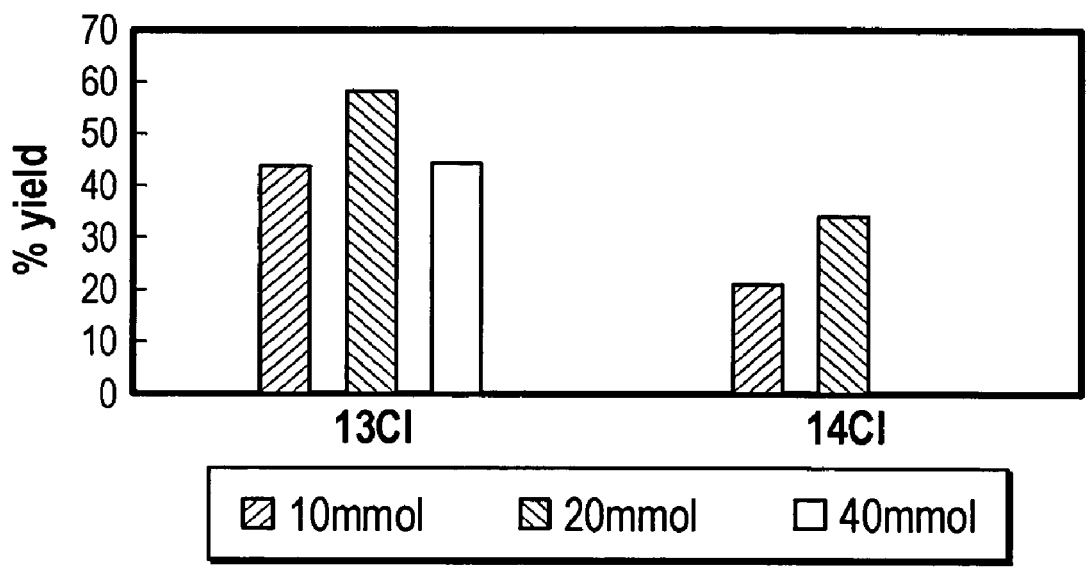
FIG. 6 is a chart showing the effect of scale up of synthesis on yields of the reaction.

The synthesis of diquaternary amines involved heating a solution of tertiary amines with alkyl halides in an appropriate solvent at about 110° C. for two days. 10 mmol of diamine and 40/60 mmol alkyl halide were used for a synthetic reaction. Experiments were carried out to slowly increase the size of the batch in each reaction by two orders of magnitude (20 mmol scale and 40 mmol scale). During the scaling up, the yields of these reactions were determined and compared with small scale reaction. The results are presented in FIG. 6, showing that Diquats can be synthesized on a large scale without compromising the yield.

The efforts to increase the scale of synthesis have been very successful. One major concern was the effect that could have on the yield of the reaction. As can be seen in FIG. 6, the yields of major diquats, DQ 13Cl and DQ 14Cl were constant or higher when they were scaled up. In the case of DQ 13Cl, the yield of 40 mmol scale synthesis was not higher than that of 20 mmol scale. It was because the conditions of reaction such as reaction temperature, reaction time and solvents were not optimized yet. This will be improved in the next period. During this period, it was observed that some of diquats are sensitive to heat and they were melting out during the vacuumed dry in an oven. So the synthetic condition was changed for them to vacuum dry these under room temperature condition.

EXAMPLE 6A

Back Extraction Using Three Different Acid Molarities.

5 ml of 1M HCl was contacted with 5 ml of the organic phase in a 20 ml scintillation vial, shaken vigorously for 10 min. Phase separation was aided by centrifuge at 2500 rpm. The aqueous phase was removed using a Pasteur pipette. And 5 ml of 1M HCl was contacted with the organic phase again, following the same procedure. The total volume of two aqueous phases (hydrochloric acid) was measured and recorded for platinum concentration recovered. The aqueous phase was submitted for ICP analysis. Similarly 6M HCl and 12M HCl were used for back extraction.

EXAMPLE 6B

Precipitation of Zero-Valent PGMs Using Sodium Borohydride.

Figure 7:
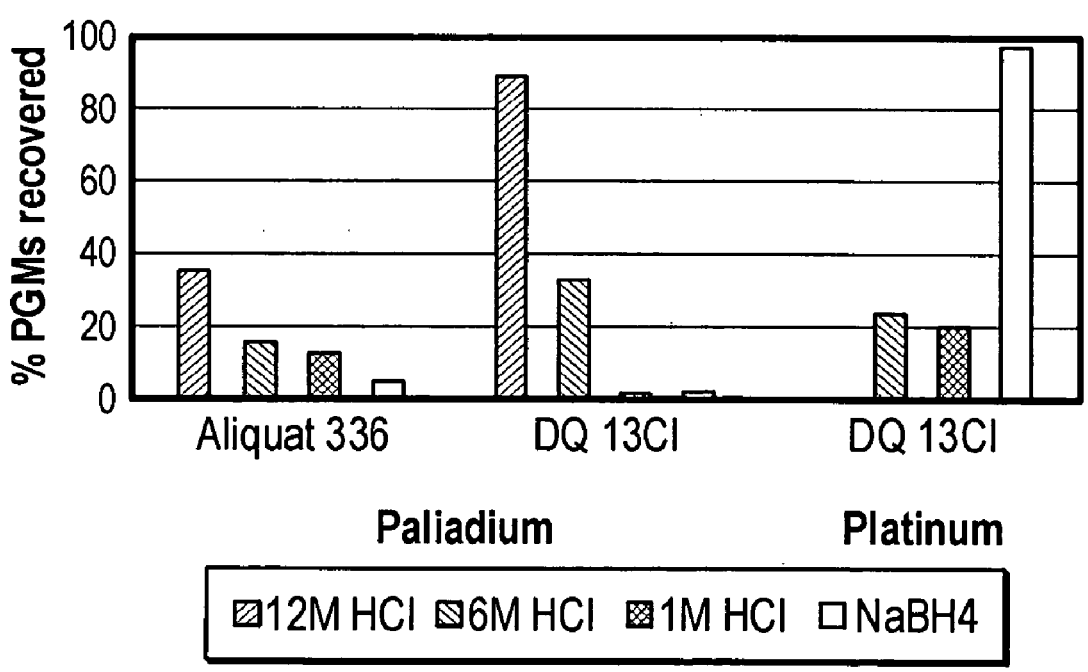
FIG. 7 is a chart comparing the percentage of PGMs recovered during back extraction experiments.

It is well known that $NaBH_4$ is a good reducing agent for metals. Therefore, $NaBH_4$ was used to obtain zerovalent PGMs from the organic solution. 0.15 g of $NaBH_4$ was added into 5 ml of organic phase in a 40 ml vial. The vial was lightly swirled until bubbling and foaming ceased. The reduced PGMs were recovered into aqueous phase by adding 5 ml of concentrated HCl and shaking the vial. Using a Pasteur pipette the aqueous phase was separated. The volume of aqueous phase was measured and recorded. The results from different back-extractions are presented in FIG. 7, showing that back-extraction of PGMs can be achieved effectively.

During this period, we developed methods to strip PGMs from the organic phase of extraction. Four potential methods were employed and the efficiency of each method was compared for palladium and platinum extraction. Three different molar concentration of hydrochloric acid solutions were used as well as sodium borohydride was employed to precipitate Pt or Pd in zerovalent stage. For platinum, $NaBH_4$ treatment resulted in the highest efficiency as 97% when compared to other two methods (FIG. 7). 12M HCl recovered 89.2% of palladium, and it was more than twice of that of 6M HCl. The efficiency of $NaBH_4$ precipitation for palladium was too low. 12M HCl showed the best results towards back extraction of PGMs (FIG. 7).

It was observed that very little time required for the back extraction step. In 5–10 min, most of the PGMs could be back extracted.

EXAMPLE 7

Kinetics of Back-Extraction.

The objective of this experiment was to understand effect of the time on efficiency of back extraction. In a typical experiment, 30 ml of 140 ppm palladium solution was extracted with 2% diquat 13Cl, and the organic phase was divided into 6 portions. Each portion had about 5 ml of organic phase. 5 ml of 6M HCl was added to each vial, and these six vials were placed in a shaker. After every 5 min, one vial was taken from the shaker and the aqueous phase was separated from the vial and used for palladium analysis.

EXAMPLE 8

Investigation of Reusability of Diquats for PGM Extraction.

In a typical experiment, diquats were used for extraction of PGMs followed by a back extraction step using HCl. The diquat solution, now free of PGMs, was used again for extraction, and the process was repeated three times. The efficiency of PGM extraction was determined in each cycle. The details are given in the following section.

Figure 8:
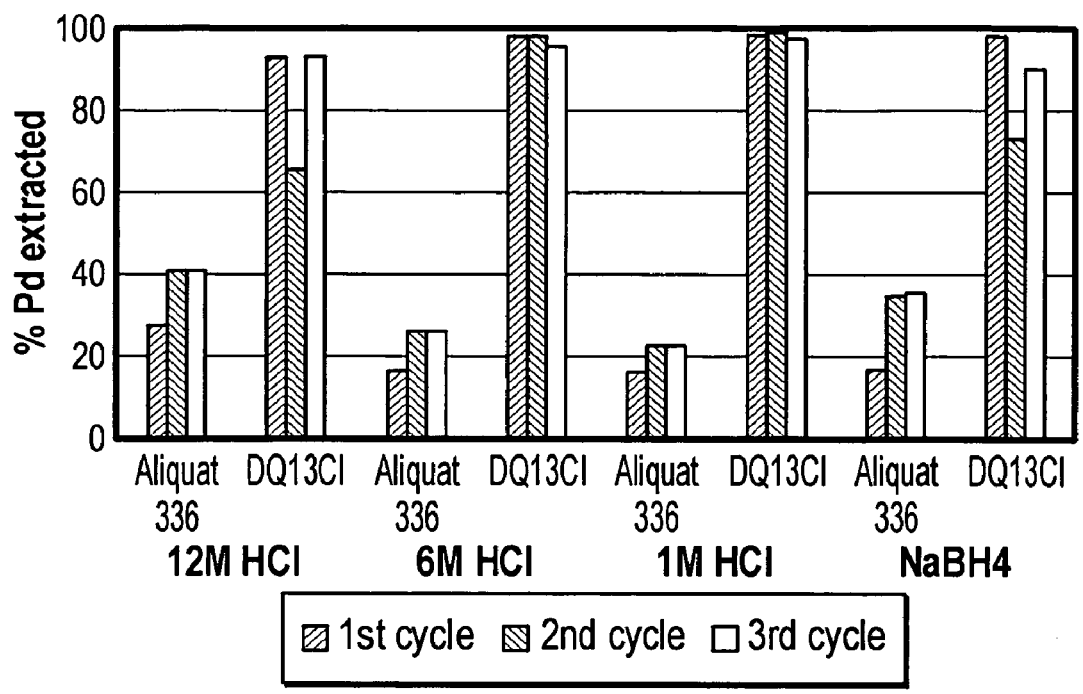
FIG. 8 is a chart comparing the efficiency of diquats in multiple extractions.

140 ppm palladium solution at 3M HCl and 2% extractant solutions like DQ 13Cl and Aliquat 336 in their standardized organic solvents were prepared for these experiments. 15 ml of PGM solution was contacted with the same volume of DQ 13Cl or Aliquat 336 solution in a 40 ml scintillation vial for 30 min by vigorous shaking. Phase separation of the mixture was then aided by centrifuging (2500 rpm; 9 min). The aqueous phases were separated using a Pasteur pipette, and then washed by contacting with 30 ml of chloroform (1 aqueous:2 organic) for 10 min with vigorous shaking. Phase separation was again aided by centrifuge. The volume of the aqueous phase was measured, recorded and submitted for residual metal concentration. The organic phase was split to three portions and three different back-extraction methods were employed to each portion then. The aqueous phases were separated from the organic phases and the volumes were measured, recorded, and submitted to ICP analysis for PGMs concentration recovered. After back-extractions of each organic phase, the organic phase became free of PGMs. So the organic phase (i.e. DQ 13Cl solution or Aliquat 336 solution) was reused for another extraction (the next cycle). This procedure was repeated three times (three cycles). Aqueous phases from each extraction and back-extraction were analyzed for residual PGMs and recovered PGMs respectively. The results are in FIG. 8, showing that Diquats could be reused effectively in multiple extractions of PGMs.

Once PGM has been extracted from its acid solution, it was stripped out using different methods of back-extraction. The diquat solution, now free of PGMs, was repeatedly used three times. The efficiency of PGM extraction was determined in each cycle. Diquat absolutely outperformed Aliquat 336 in multiple cycles of extractions. The efficiency was approximately constant or slightly lower during the cycles (FIG. 8).

EXAMPLE 9

Evaluation of the Capacity of Diquats for Extraction of PGMs.

In order to make the progress of extraction cost effective it is important to reuse the extractants over and over without any loss of efficiency. This experiment was designed to determine the maximum extraction capacity of diquats in order to reuse the same materials in multiple cycles of extraction followed by a back-extraction step. This experiment provided us with valuable information on the number of times a diquat can be reused, which has an effect upon the cost effectiveness of diquats.

Figure 9:
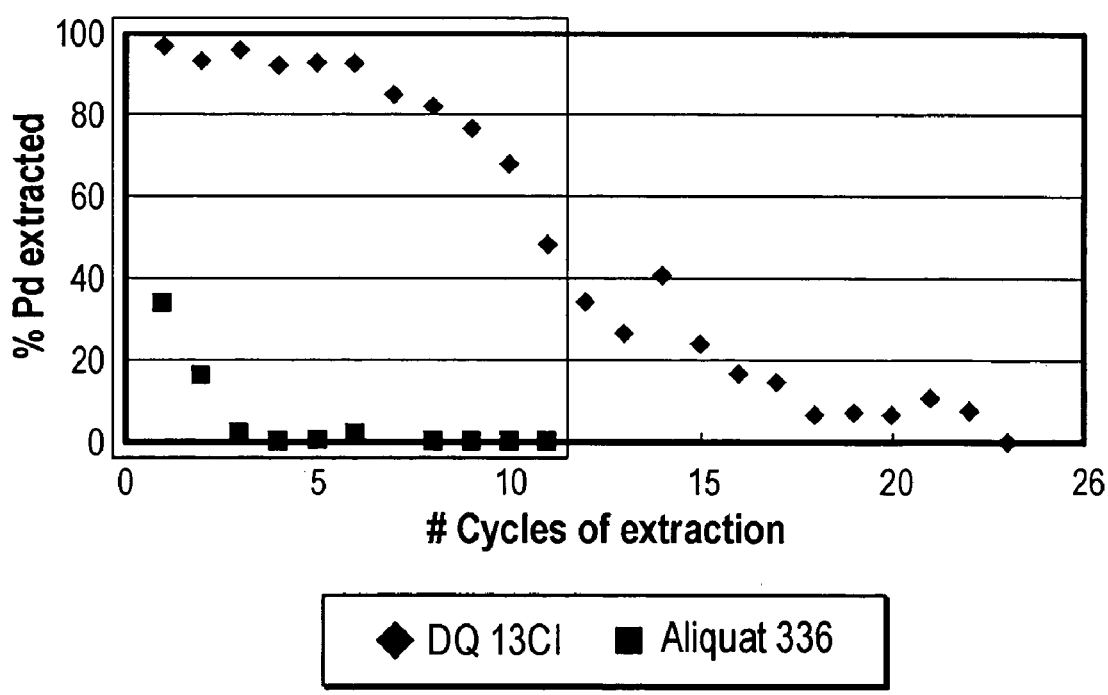
FIG. 9 is a chart showing the efficiency of DQ 13Cl in continuous Pd extractions.

In this experiment, 140 ppm Pd in 3M HCl was added into 2.5% DQ 13Cl (0.363 mmol) or Aliquat 336 (0.569 mmol) at every extraction cycle. After mixing of Pd solution and extractant solution in a scintillation vial, the aqueous phase was separated from the vial for the analysis of the residual PGMs concentration. 140 ppm Pd solution was added again into the same organic phase for the next cycle. The efficiency of PGM was determined in each cycle. The result is presented in FIG. 9, showing that diquats have higher capacity to extract PGMs than a commercial product, Aliquat 336.

From the investigation of the reusability of diquats above we observed the cycle could be repeated more than three times. This experiment was designed to determine the extraction capacity of diquats, so that the diquat can be reused multiple cycles of extraction until the saturation, and then the solution can be back-extracted. In FIG. 9, The Aliquat 336 already lost its extractability at $4^{th}$ cycle whereas diquat could hold its extractability over 90% at the cycle and the efficiency of diquat was over 50% till the $10^{th}$ cycle. In this experiment, 0.363 mmol DQ 13Cl extracted 0.131 mmol of palladium while 0.007 mmol of palladium was extracted by 0.569 mmol of Aliquat 336 during this experiment. The reason why the extracted ratio was not equimolar can be explained after investigating the elucidation of chemical bonding of PGMs with diquats. Conclusively, the diquat extractant has higher capacity to extract PGMs than a commercial product, Aliquat 336.

EXAMPLE 10

Effect of Changing Acid to Solvent Ratio on Back Extraction Efficiency.

To conduct effective back-extraction optimum volume of reagent of back extraction should be determined. This was achieved by using 6M HCl in four different ratios of acid to organic phase: 1.5:1, 2:1, 3:1, and 4:1. In each experiment, 5 ml of organic phase was extracted by 6M HCl. 3:1 ratio produced the best results.

EXAMPLE 11

Recycling HCl Used During Back Extraction.

Figure 10:
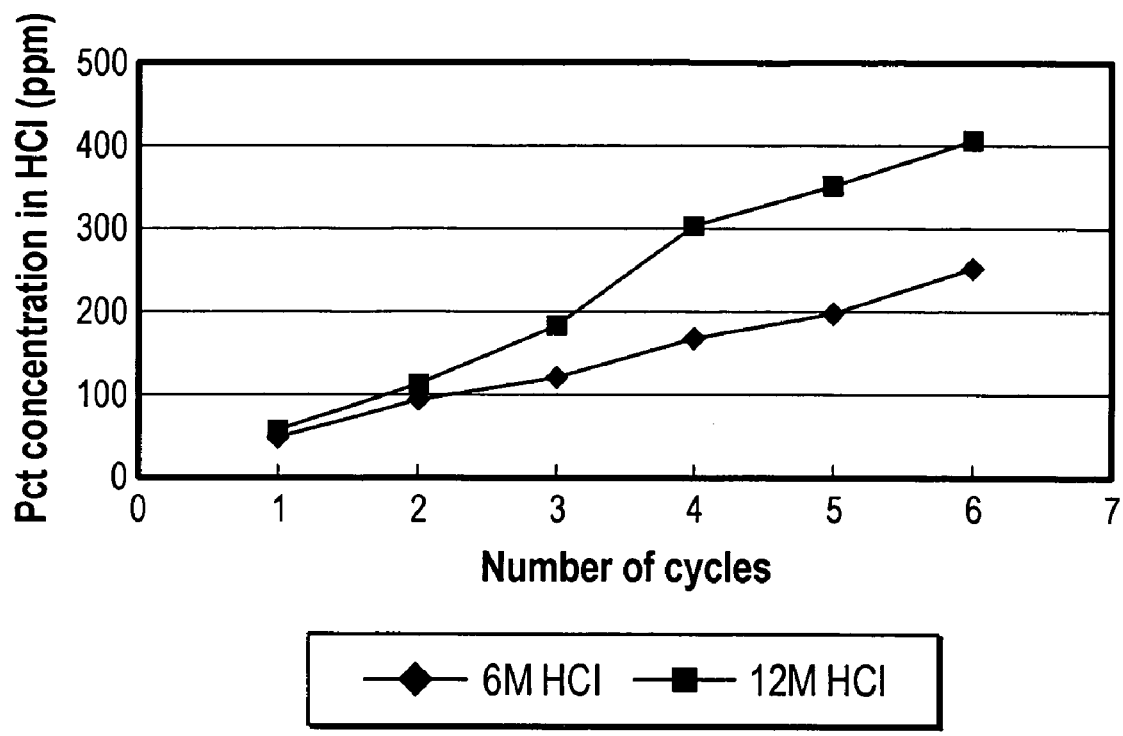
FIG. 10 is a chart showing the concentration of Pd back-extracted in HCl.

Both 6M and 12M HCl were used to evaluate their capability to back extract PGMs in multiple cycles without any loss in efficiency. 55 ml of HCl (6M or 12M) was added into the first vial of organic phase and then shaken vigorously for 10 min. The aqueous phase was separated from the vial, and then 5 ml of acid solution was taken for the Pd concentration analysis. The rest of aqueous solution was reused for the $2^{nd}$ vial. After shaking and phase separation, the aqueous phase was removed again and 5 ml of acid solution sample was taken for analysis. This procedure was repeated till $6^{th}$ cycle. Palladium concentrations in the acid are presented in FIG. 10, showing that HCl can be reused for back-extractions.

To optimize the cost effectiveness of PGM recovering process, stripping reagent, HCl, should be reused as well. This experiment examined the reusability of stripping reagent, 6M and 12M HCl. As can be seen in FIG. 10, the concentration of Pd extracted out into acid kept on increasing as a function of multiple cycles of back extraction. These results indicate that HCl can be effectively reused as a stripping reagent.

To conduct effective back-extraction the volume of reagent of back-extraction should be determined. This was achieved by using 6M HCl in four different ratios of acid to organic phase: 1.5:1, 2:1, 3:1, and 4:1. From these studies it was observed that a volume ratio of 3:1 is the optimum for back extraction experiments.

EXAMPLE 12

Feasibility of Electrochemical Recovery of PGMs.

Figure 19:
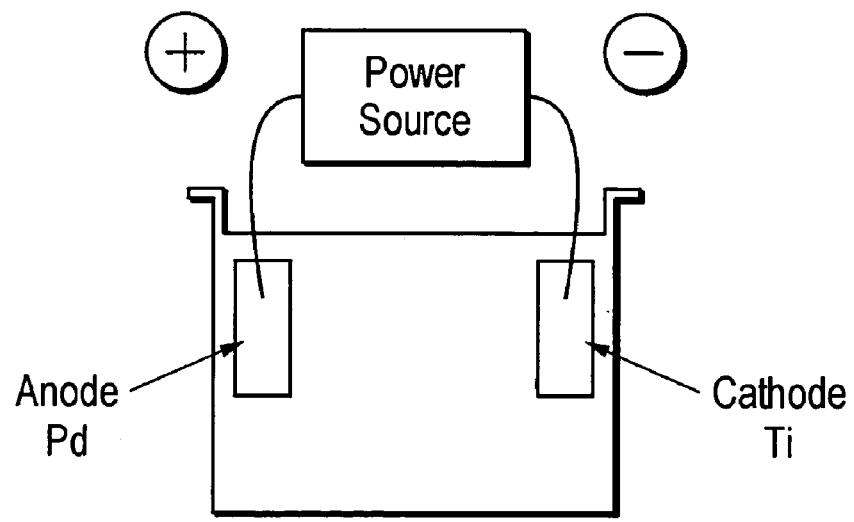
FIG. 19 is a schematic diagram of an apparatus for electro-deposition of PGMs.

The electro-deposition of PGMs is conventionally used to recover PGMs in industry. The schematic diagram is shown in FIG. 19. This experiment is designed to show the feasibility of electrochemical recovery of PGMs from the acid-stripping reagent as solid metals. The anode was a palladium foil and, the cathode was titanium gauze, and the electrolyte was $PdCl_2$ in 12M HCl, which is supposed to be a stripping reagent in real. The minimum current of the power source was 10 mA. For the experiments, current was changed variously. From the difference of initial weight of palladium foil and final one, we could calculate how much palladium was plated on the foil out of the bath during the experiment. The results are presented in Table 7, showing that zero-valent PGMs can be recovered by conventional electrochemical method.

This experiment was designed to show the feasibility of conventional electrochemical recovery of PGMs from the acid-stripping reagent. During the experiments, hydrogen evolution was observed from the anode because the current was not optimized yet. Chlorine was not generated at cathode as well. Since palladinized palladium foil had a dark surface, we could confirm the electro-deposition worked. While the optimum current was still not observed in the experimental range, it can be obtained by making cyclic voltammograms. Since we are focusing on the extraction and back-extraction processes in this project we are not optimize the method. Still the result (Table 7) shows the feasibility of electro-deposition as the final step of PGMs recovery process in order to obtain usable forms of PGMs.

TABLE 7

Deposition efficiency according to the current change

| | Current (mA) | | | | |
|---|---|---|---|---|---|
| | 10 | 15 | 18 | 20 | 22 |
| Efficiency (%) | 20.87 | 12.18 | 1.98 | 16.47 | 11.14 |

It is believed that optimization of this process will result in higher efficiencies. Other electrowining processes and conditions may be used.

EXAMPLE 13

PGMs Recovery from Spent Catalytic Converters.

Palladium was removed by adding KI and octanol into a dissolved catalytic converter solution (KI treatment) before the extraction with diquat. This solution was used to extract Pt from the base metals using both Aliquat 336 as well as diquats under identical conditions.

Figure 11:
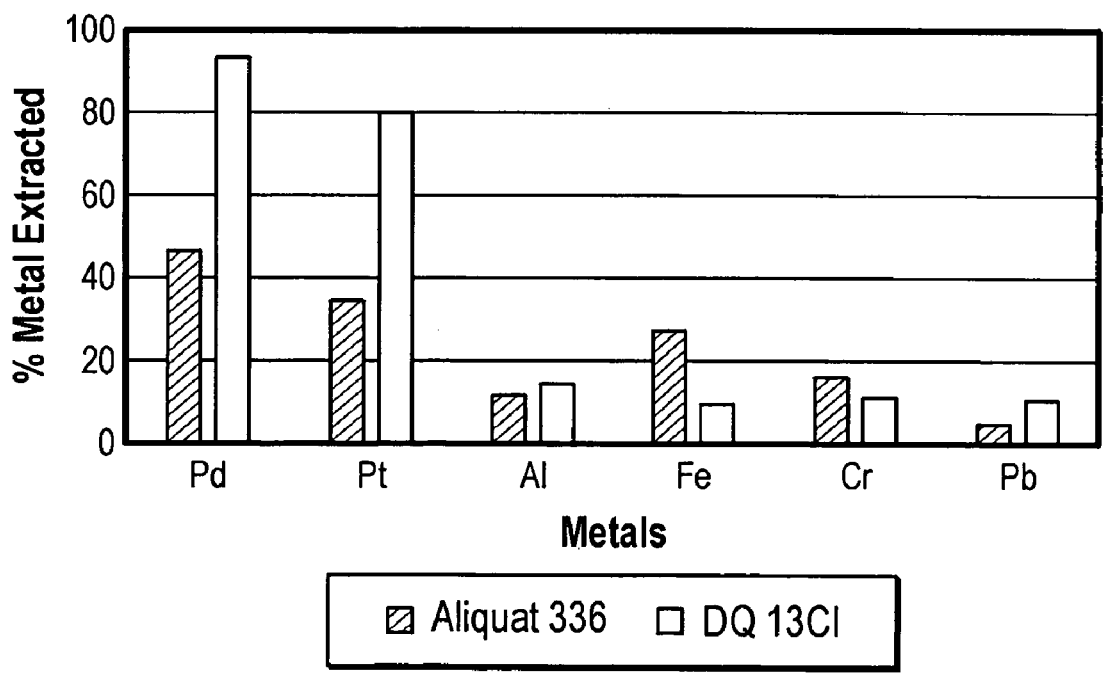
FIG. 11 is a chart showing the selectivity of diquats towards extractability of PGMs from base metals.

For this experiment, a chunk piece of a monolith of a catalytic converter was crunched into small pieces, digested in hydrochloric acid with heat and diluted in 3M HCl be adding deionized water to the digested solution. Using the catalytic converter solution KI treatment was conducted to remove palladium first because KI selectively extracted palladium over other PGMs and base metals. 0.012 g KI was added into 60 ml of the catalytic converter solution and then 60 ml octanol was added as well into the vial and the mixture was shaken for 30 minutes. After phase separation, 10 ml of aqueous phase is submitted for residual metals analysis. The rest of solution was used for DQ 13Cl extraction and Aliquat 336 extraction. The aqueous phases from each extraction were submitted for the residual PGMs analysis by ICP. The organic phase of KI treatment was reused for second KI treatment to remove the rest of palladium in organic solution. The result is presented in FIG. 11, showing that the Diquats outperformed commercial product, Aliquat 336 in extraction using Honda catalytic converter solution.

Both Aliquat 336 and DQ 13Cl were used to compare the efficiencies of two extractants. As seen in FIG. 11, diquat had higher selectivity over base metals and high efficiency to extract PGMs from the catalytic converter solution while Aliquat 336 picked up more Fe and Cr and low recovery rates of PGMs from the solution. Conclusively diquats outperformed Aliquat 336 in extraction using Honda catalytic converter solution.

EXAMPLE 14

Synthesis and Characterization of New Diquats

Figure 12:
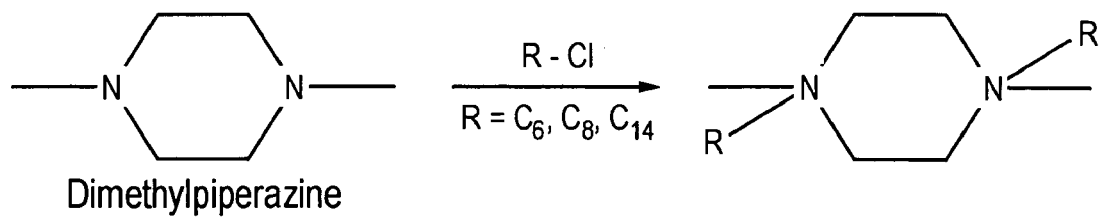
FIG. 12 is a chart illustrating a synthetic scheme for synthesis of new diquaternary amine compounds.

Three new diquats were synthesized that varied only in the length of the side chain substitution on the quaternary nitrogens as shown in FIG. 12. The synthesis of the new diquats was similar to the established procedure for diquats synthesis.

In a typical synthesis reaction, 10 mM of a diamine (1,4-Dimethylpiperazine (DMP)) was added to 25 mL of dimethyl formamide in a 200 mL round bottomed flask. To this solution was added a 4× molar excess of an alkyl chloride (1-Chlorohexane (CH), 1-Chlorooctane (CO), 1-Chlorotetradecane (CTD)). This was followed by the addition of 0.2 g of sodium carbonate and a stir bar. The flask was then placed in a magnetically stirred/heated oil bath at ~110° C. and capped with a 20° C. water-cooled reflux condensor. The reflux condensor was sealed with a rubber septum and vented with a syringe needle. The reaction mixture was then sparged with argon, heated and stirred for 48 hours.

Synthesized diquaternary amines were precipitated using 100 mL of a 1:1 mixture of hexanes: benzene. Solutions were then placed at −15° C. overnight. Precipitates were isolated by vacuum filtration on FisherBrand Medium-Fine filter paper, being washed with additional 20 mL of solvent mixture and vacuum dried overnight at room temperature. Products were weighed, sealed in glass vials and labeled, and stored at 5° C. until further use. The yields of the new diquats syntheses were 45%, 1%, 20% for $C_6$, $C_8$, $C_{14}$ respectively. The synthesis and work up conditions of these syntheses have not yet been optimized which accounts for the low yields. These will continue to be worked on in the next period.

Slight variations in heating conditions were used during the synthesis of the new compounds. The temperature was kept at 110° C. for the $C_{14}$ diquat and 90° C. for the shorter chain diquats, $C_6$ and $C_8$. The $C_6$ and $C_{14}$ diquats were stable compounds at room temperature. The $C_8$ diquat was initially unstable at room temperature so workup and storage conditions were modified to keep this diquat in solid form.

EXAMPLE 15

Testing of New Diquats for PGM Extraction Selectivity

Figure 13:
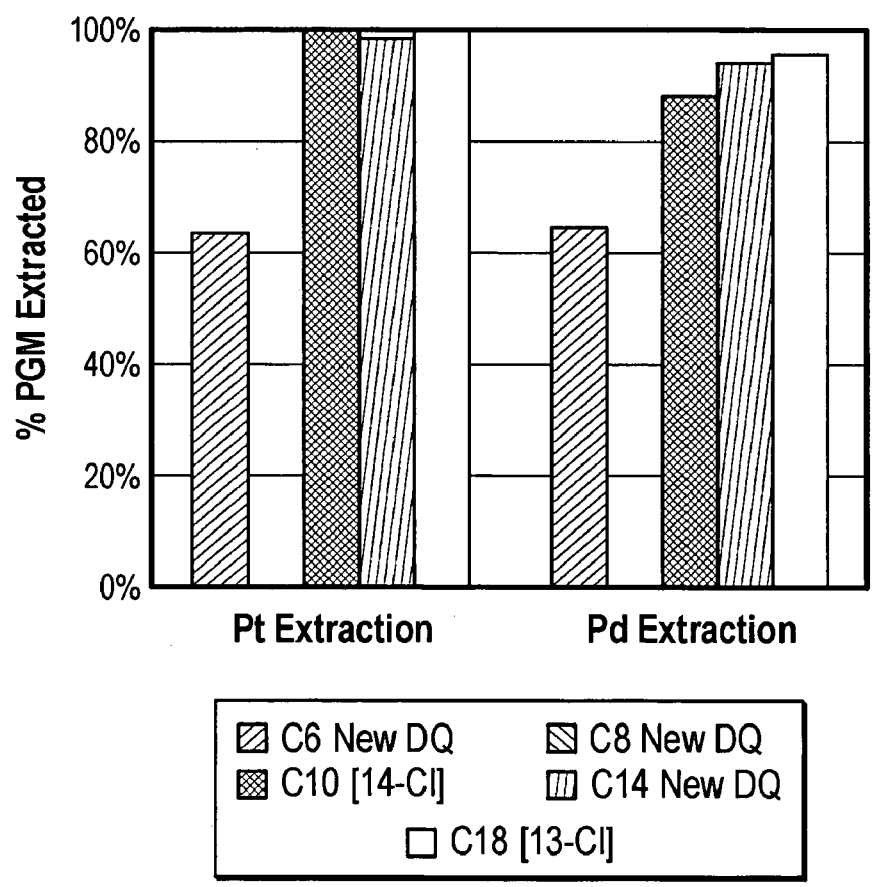
FIG. 13 is a chart showing that longer side chain substitution increases PGM extraction efficiency.

Preliminary extraction tests were carried out with the three new diquats synthesized to compare their extraction efficiencies to those of the previously synthesized diquats. For these extractions, 5 mL of a 2.5% diquat solution was contacted with 5 mL of 50 ppm PGM (platinum or palladium) solution in 3M HCl for 30 minutes with vigorous shaking. Phase separation was aided by centrifuging the samples at 2500 rpm for 3 minutes. The aqueous phase was then removed by pasteur pipet and washed with 12–15 mL of fresh chloroform (1 aqueous:2 organic) for 1 minute with vigorous shaking. Phase separation was again aided by centifugation and the washed aqueous phase was removed. The volume of the washed aqueous phase was measured as well as the weight of the total aqueous phase and then analyzed by in house Inductively Coupled Plasma Atomic Emission Spectrometry for PGM concentration. The extraction results for the new diquats as well as DQ's 13-Cl and 14-Cl can be found in FIG. 13.

Testing the Effect of Side Chain Substitution on Diguat Extraction Efficiency

The three new diquats, $C_6$ ($C_6H_{13}$+DMP), $C_8$ ($C_8H_{17}$+DMP) and $C_{14}$ ($C_{14}H_{29}$+DMP), along with DQ 14-Cl ($C_{10}H_{21}$+DMP) and 13-Cl ($C_{18}H_{37}$+DMP) comprise DQ compounds of side chain length ranging from $C_6H_{13}$ to $C_{18}H_{29}$. These five diquats were used to study the effect of side chain length on extraction efficiency. Each of these diquats, new and old, were used, in 2.5% solutions, to extract 50 ppm of both platinum and palladium solutions. 13-Cl and 14-Cl are two of the better performing diquats of all previously synthesized diquats in terms of extraction efficiency and thus also served as a good standard to compare the extraction efficiency of the new diquats. The efficiency of each diquat was calculated and is displayed in FIG. 13 below. The concentration of the metal extracted by the diquat was assumed to be the difference between the concentration of metal in the aqueous phase before and after the extraction.

As can be seen, the diquats with the longer side chains, extracted more PGM's than those with shorter side chains such as $C_6$ and $C_8$. Also, the $C_{14}$ new diquat was as efficient in extracting PGM's as DQ's 13-Cl and 14-Cl. Diquat 13-Cl has a side chain length of $C_{18}$ while diquat 14-Cl has side chain length of $C_{10}$. The $C_{14}$ new diquat has intermediate chain length between that of 13-Cl and 14-Cl and was as efficient as both of these previously studied diquats. Based on pricing information from Sigma Aldrich®), the alkyl halide, 1-Chlorotetradecane, used to synthesize the $C_{14}$ new diquat is significantly cheaper than the alkyl halides, 1-Chlorodecane or 1-Chlorooctadecane, used to synthesize 14-Cl and 13-Cl respectively.

EXAMPLE 16

Investigation of the Material Balance of PGM Extraction

Experiments were carried out to try and determine the material balance of PGM's at every step of the extraction and recovery process. This information about the material balance is essential for the development of the pilot plant and further commercialization. To determine the material balance of the extraction process 5 continuous extractions of platinum were carried out with 1.0%, and 1.5% solutions of DQ 13-Cl and Aliquat 336 where both aqueous and organic phases were tested for PGM concentration. Only aqueous phases were analyzed in all previous experiments and PGM concentration was determined from the amount of PGM's in the aqueous phase before and after the extraction. The experimental procedure is detailed below.

Figure 14:
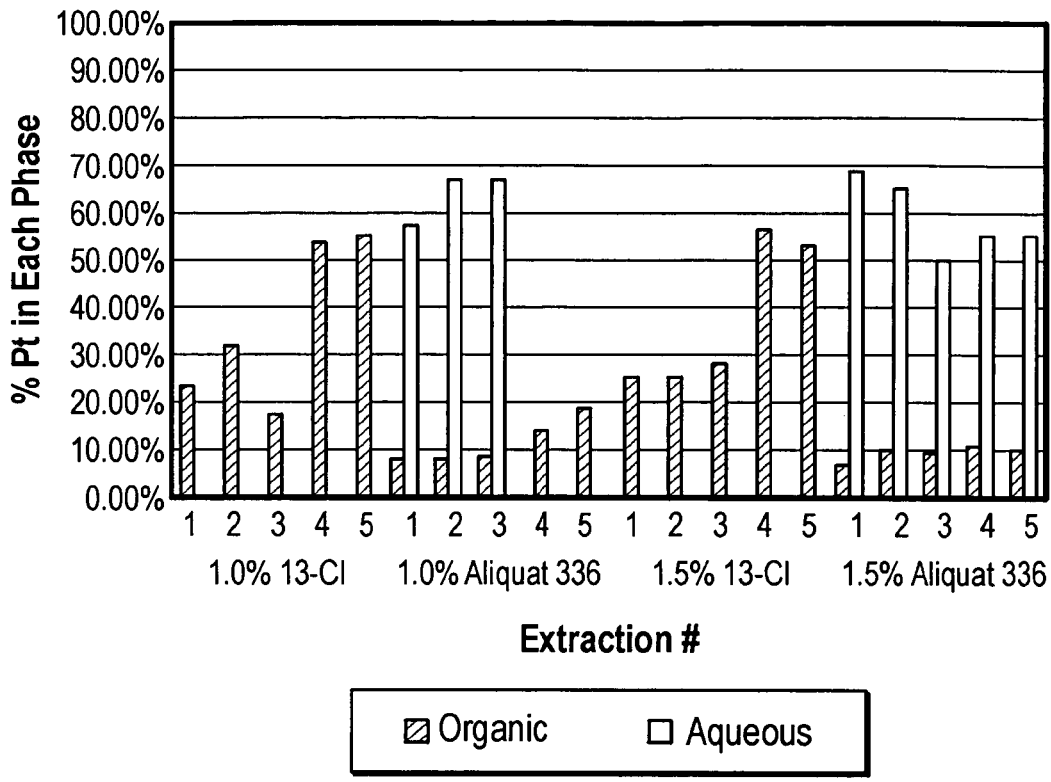
FIG. 14 is a chart showing the percentage of Pt in each phase.

15 mL of the 13-Cl or Aliquat 336 solutions was contacted with 10 mL of the 140 ppm platinum solutions for 30 minutes with vigorous shaking. Phase separation was aided by centrifuging the mixtures for 6 minutes at 2700 rpm. The aqueous phases were separated using a pasteur pipet then washed with 25 mL of fresh chloroform (1 aqueous:2 organic) by shaking it vigorously for 10 minutes. Phase separation was again aided by centifugation and the washed aqueous phase was removed. The volume of the washed aqueous phase was measured and a 5 mL sample was removed and submitted for in house ICP analysis for residual platinum concentration. A 1 mL sample was also taken from each organic phase for ICP analysis of platinum concentration. 15 mL of 140 ppm platinum solution was then added to this same organic phase for the next extraction. The percentage platinum found in both phases after each extraction was calculated and can be found in FIG. 14.

Investigation of Material Balance During Multiple Extractions

As part of the investigation into the diquats interaction with the PGM's during the extraction process, an experiment was conducted to find the concentration of PGM's at each step in the process. Five continuous extractions were performed with 1.0% and 1.5% DQ 13-Cl and Aliquat 336 solutions. Both the aqueous and organic phases of every extraction of this experiment were tested for Platinum concentration. The % Platinum found in each phase after each extraction is displayed in FIG. 14. These experiments showed more than 90% of material that balance in each extraction. Thus reassuring that PGM's that are extracted from Aqueous solutions can be recovered back in organic solutions with suitable back extraction solvents. The results from this experiment also provide further evidence of the superior performance of Lynntech's diquats compared to Cognis' monoquat product for PGM extraction. Another experiment was conducted as part of this material balance investigation where the binding capacity of different diquats was calculated.

EXAMPLE 17

Determination of the Binding Capacity of Different Diquats

Another material balance related experiment was conducted that aimed at calculating the binding capacity of different diquats. A two-cycle experiment was performed where a single cycle involves an extraction step followed by a back extraction or stripping step with 12M HCl. The details of both steps are given below.

Extraction Procedure 0.5% diquat solutions were made with 13-Cl, 14-Cl, 17-Cl and 18-Cl in their standardized organic solvents. 15 mL of these diquat solutions were contacted with 15 mL of 140 ppm platinum solution in 3M HCl for 30 minutes with vigorous shaking. Phase separation was aided by centrifuging the mixtures for 6 minutes at 2700 rpm. The aqueous phases were separated using a pasteur pipet then washed with 30 mL of fresh chloroform (1 aqueous:2 organic) by shaking it vigorously for 10 minutes. Phase separation was again aided by centifugation and the washed aqueous phase was removed. The volume of the washed aqueous phase was measured and a 5 mL sample was removed and submitted for in house ICP analysis for residual platinum concentration.

12M HCl Back Extraction Procedure

The organic phase from the extraction step was split in half to carry out two different back extraction methods, 12M HCl and $NaBH_4$ precipitation. The $NaBH_4$ back extraction method is still under investigation. This organic phase, now containing platinum, was back extracted with 12M HCl (1 organic:2 aqueous). The organic phase was contacted with aqueous 12M HCl for 10 minutes with vigorous shaking. Phase separation was aided by centrifugation for 3 minutes at 2700 rpm. The volume of the washed aqueous phase was measured and a 5 mL sample was removed and submitted for in house ICP analysis for platinum concentration recovered. This is the end of the $1^{st}$ cycle.

After the back extraction step, the organic phase was theoretically free of platinum and was used for the $2^{nd}$ cycle beginning with the extraction step again with 140 ppm platinum solution. The extraction efficiency of both of these cycles was calculated and is displayed in FIG. 16.

A low concentration of diquat solutions, 0.5%, was used in order to saturate the diquats with PGM's. Binding capacities were calculated based upon the concentration of PGM's in the saturated diquat after the first extraction. These values are given in numerical form in Table 8. and in graphical form in FIG. 15.

Another aspect of the material balance that was investigated was the binding capacity of the diquats. The knowledge of how much PGM can be extracted with a certain amount of diquat is crucial for the development of a pilot plant and eventual large scale commercialization. This information about the binding capacity of the diquats was achieved by analyzing data from a two cycle (cycle=extraction followed by back extraction) experiment with 0.5% 13-, 14-, 17- and 18-Cl and 140 ppm Platinum solutions. The numerical mole amounts of both the diquats and platinum are collected in Table 8 below. These values are also presented in FIG. 15.

TABLE 8

Binding capacities of different diquats

| | moles of DQ used | moles of Pt extracted | Ratio | grams of DQ used | mg's of Pt extracted | Capacity in mg/g |
|---|---|---|---|---|---|---|
| 13-Cl | 1.082E−04 | 1.040E−05 | 0.096 | 0.075 | 2.029 | 27.05333 |
| 14-Cl | 1.610E−04 | 1.006E−05 | 0.062 | 0.0753 | 1.963 | 26.06906 |
| 17-Cl | 1.062E−04 | 1.635E−06 | 0.015 | 0.0752 | 0.319 | 4.242021 |
| 18-Cl | 1.561E−04 | 2.835E−06 | 0.018 | 0.0755 | 0.553 | 7.324503 |

Figure 15:
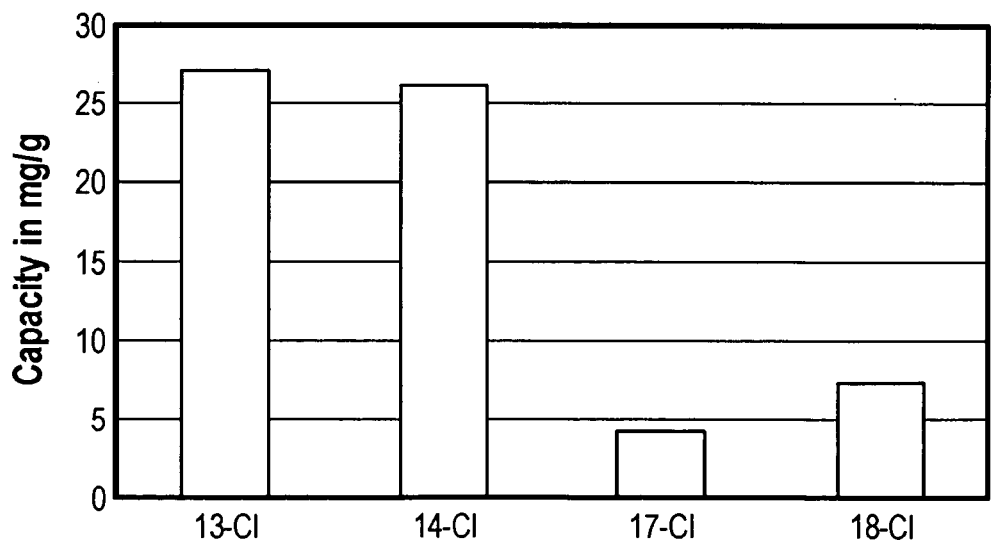
FIG. 15 is a chart showing the binding capacities of different diquats.
Figure 16:
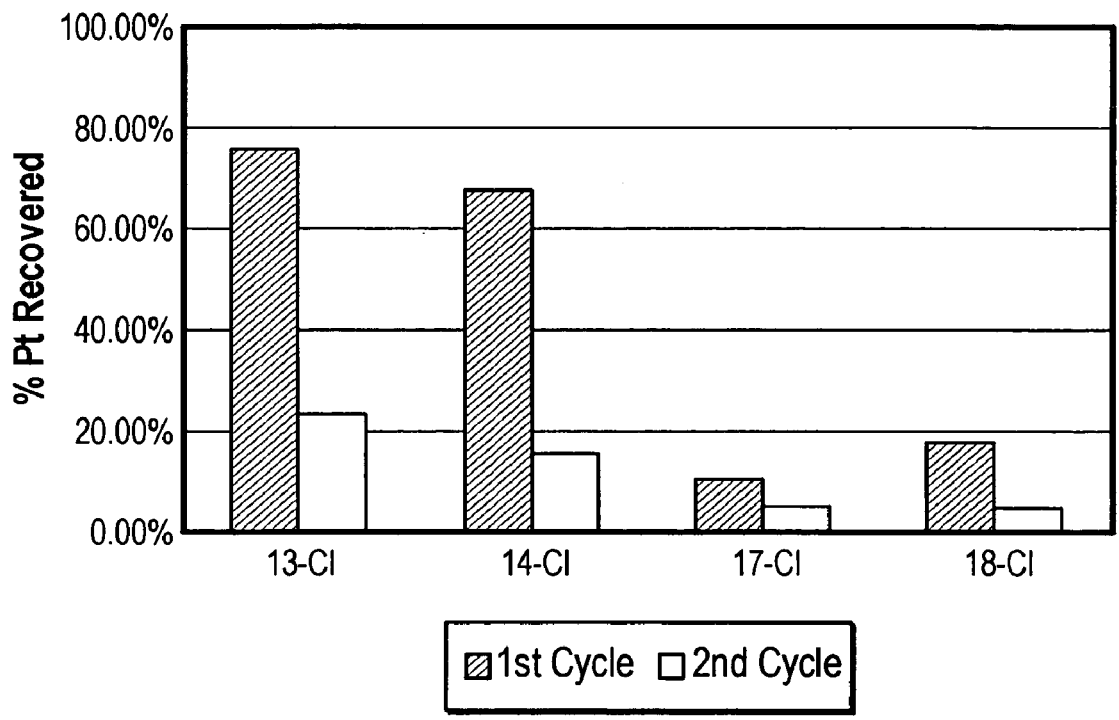
FIG. 16 is a chart showing that the diquats 13-Cl and 14-Cl outperform the diquats 17-Cl and 18-Cl and continue to extract a majority of PGMs at low concentrations.

As you can see from FIG. 15, 0.5% solutions of DQ's 13-Cl and 14-Cl have a much higher binding capacity for platinum than 17-Cl and 18-Cl. FIG. 16 below displays the extraction efficiency of the 2-cycle experiment. 13-Cl and 14-Cl also recovered the most platinum for both cycles outperforming 17- and 18-Cl significantly. 13-Cl and 14-Cl were still able to recover 75% and 67% respectively even at such a low diquat concentration of 0.5%. The cost of the diquat PGM extraction process can be greatly reduced by using lower concentrated diquats while continuing to extract over 65% of the PGMs. As expected, the second cycle had a much lower extraction efficiency than the first due to the high level of saturation achieved in the first extraction.

EXAMPLE 18

Determination of the Extraction Capacity of Diquats

The continuous reusability of the diquats before a back extraction is needed can make the PGM extraction process more cost effective. An experiment involving 10 continuous extractions with 1.0% 13, 14, 17-Cl diquat and 140 ppm platinum and palladium solutions was carried out to examine the extent of continuous reusability of these diquats. In this experiment, 20 mL of the diquat solutions were contacted with 20 mL of the aqueous PGM solutions for 30 minutes with vigorous shaking. Phase separation was aided by centrifuging the mixtures for 6 minutes at 2700 rpm. The aqueous phases were separated using a pasteur pipet then washed with 40 mL of fresh chloroform (1 aqueous:2 organic) by shaking it vigorously for 10 minutes. Phase separation was again aided by centrifugation and the washed aqueous phase was removed. The volume of the washed aqueous phase was measured and a 5 mL sample was removed and submitted for in house ICP analysis for residual Platinum concentration. The chloroform washes contained residual organic (diquats-PGMs) and therefore was evaporated down to ~1 mL of volume in an Erlenmeyer flask and then added to organic phase before continuing with the next extraction. 140 ppm PGM solution was then added to this same organic phase for the next extraction.

Figure 17:
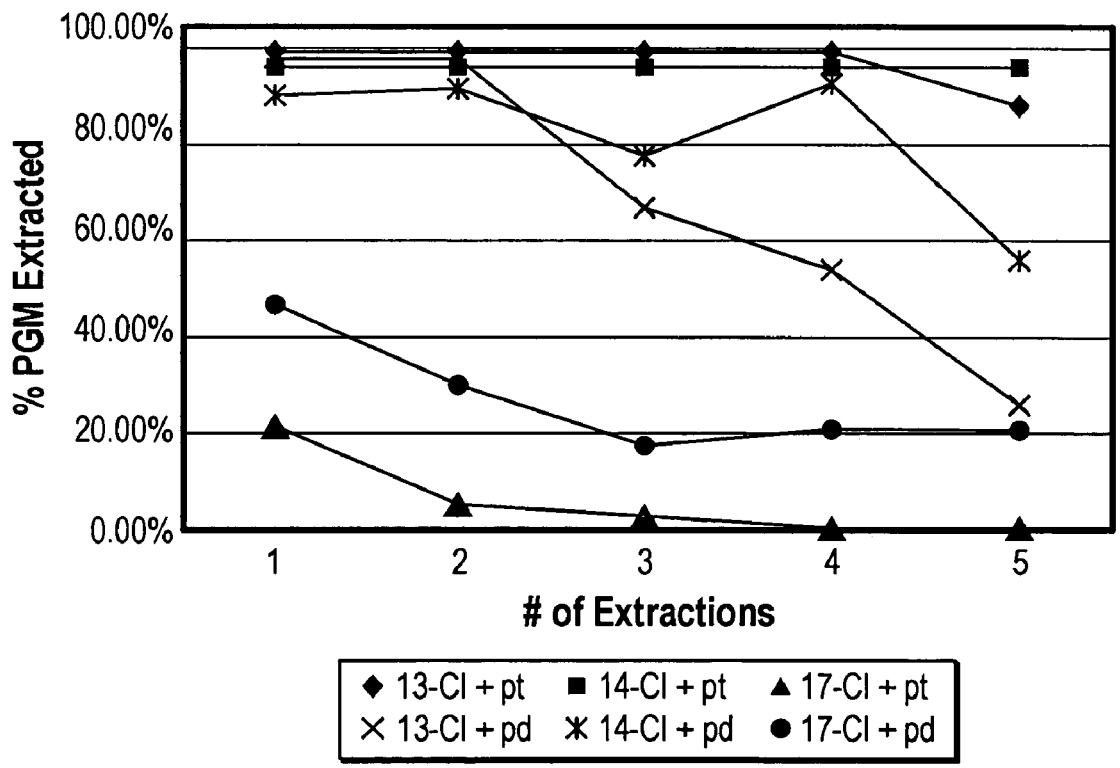
FIG. 17 is a chart showing that the diquats 13-Cl and 14-Cl continue to extract over 90% of PGM's in multiple extractions.

This experiment is currently in progress, but the first 5 continuous extractions have been completed and aqueous phases analyzed. The efficiency of these first 5 extractions was determined and is presented in FIG. 17, showing that Diquats can be continuously reused with little loss in efficiency Preliminary experiments indicated that diquats could be effectively reused to extract PGM's with no back extraction step required. This earlier experiment also demonstrated the superior performance of the present diquats compared to the commercially available product, Aliquat 336. A more comprehensive experiment to further investigate the possibility of diquat reusability involved 10 continuous extractions of both Platinum and Palladium using three of the best performing diquats identified. As can be seen in FIG. 17. 13-Cl and 14-Cl continue to extract over 90% of the platinum after 5 continuous extractions. These results indicate that a single batch of diquats solution can be used multiple time for extracting PGM's without compromising the removal efficiency. Such a characteristic will further improve the economic viability of the process during commercialization.

EXAMPLE 19

Investigation of Reusability of the Stripping Agent with Platinum

Figure 18:
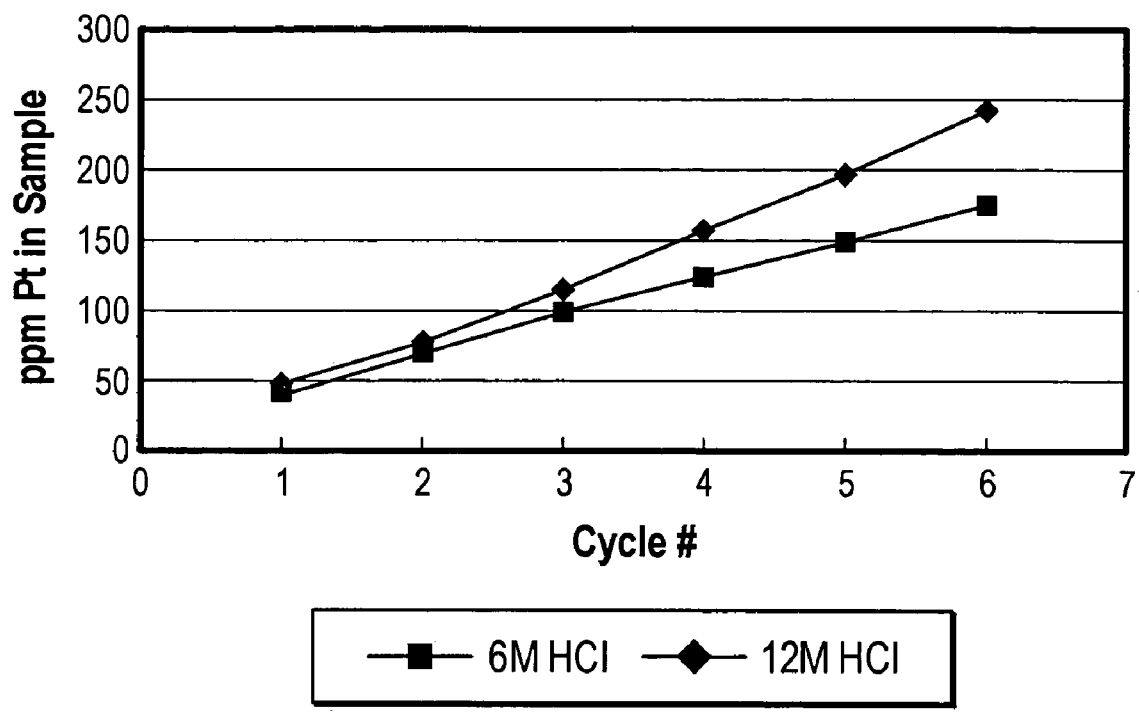
FIG. 18 is a chart showing that HCl can be reused effectively for multiple back extractions.

Reusability of the stripping agent used for back extracting PGMs from bound diquats can also improve the cost efficiency of the extraction process. An experiment was conducted to determine if HCl could be reused as a stripping agent for platinum. A similar experiment was conducted to determine the extent of the reusability of HCl as a stripping agent for palladium during the first six-month period. 55 mL of 12M or 6M HCl was contacted with a 5 mL aliquot of a saturated organic phase. This organic phase was prepared by extracting 40 mL of 2000 ppm platinum solution with 40 mL of 0.5% DQ 13-Cl. The mixture was shaken vigorously for 10 minutes, then centrifuged to aid separation of the phases. The aqueous phase was removed, its volume measured and a 5 mL sample removed for ICP analysis for platinum concentration. The remaining aqueous phase was then contacted in a similar manner with another 5 mL aliquot of the same organic phase mentioned above. This process was repeated 6 times. Aqueous samples were analyzed for platinum concentration after each contact with the saturated organic phase aliquots and the results can be found in FIG. 18. FIG. 18 shows that HCl can be continuously reused for stripping PGMs from saturated diquats Experiments have also demonstrated the feasibility of recycling the stripping agent used for back extractions to further increase the cost effectiveness of the PGM extraction process. Accordingly, it has been established that the HCl used in the palladium extractions can be reused. Experiments with platinum confirm the results of the palladium experiment. As you can see from FIG. 18, both 12M and 6M HCl continue to accumulate platinum after each back extraction. 12M HCl also back extracted more total platinum than 6M HCl. However, a significant amount of platinum was still recovered by 6M HCl, so 6M HCl could still be used and would reduce the cost of the back extraction procedure versus using 12M HCl.

It should be noted that the commercial product did not extract any platinum in this example, while in the other examples the commercial product did extract platinum. The commercial product is not as selective as the diquaternary amines used in the present invention. Therefore, with a large mixture of metals in the metal solution, the commercial product selects metals other than the most desirable. By contrast, the diquaternary amines are quite selective and selectively extracted the desired valuable metals.

It is apparent that selectively extracting palladium first by using an iodide is beneficial because it allows the diquaternary amines to be used for extracting only the other preferred metals. Extracting capacity by the diquaternary amines is not reduced by having to extract palladium. Furthermore, it becomes apparent that selected diquaternary amines may be used in separate extracting processes after the palladium has been extracted, each additional extracting process selectively extracting one or more valuable metals from the aqueous solution. For example, after the palladium has been extracted using an iodide, platinum may be extracted using one diquaternary amine selective for platinum, and then after separation, rhodium may be extracted using a different diquaternary amine selective for rhodium.

Figure 20:
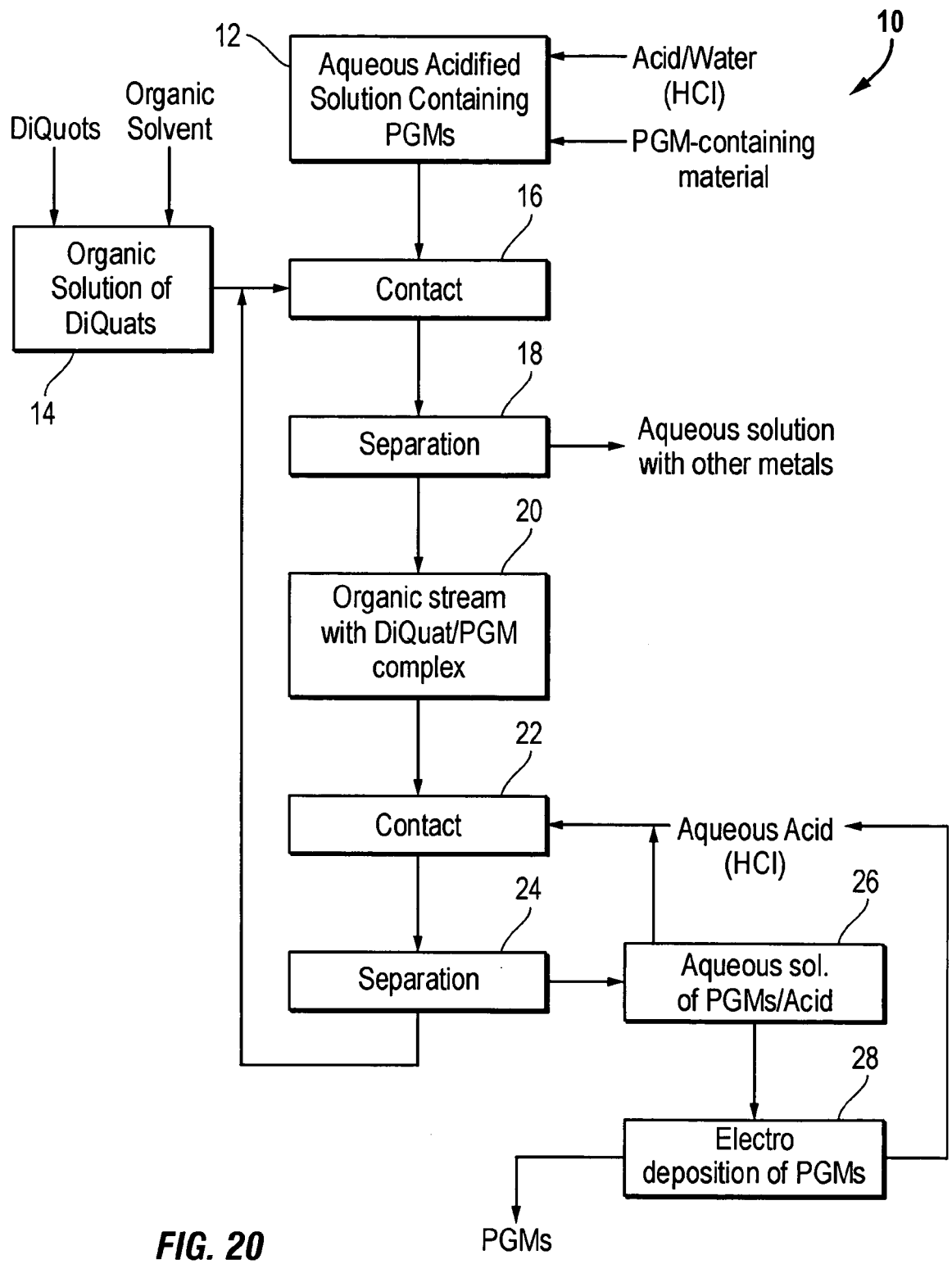
FIG. 20 is a process flow diagram illustrating a process for recovering a PGM.

FIG. 20 is a process flow diagram illustrating a preferred process for recovering a PGM. The preferred process generally includes extraction, back-extraction and electrodeposition. Other less preferred processes may include extraction without subsequent processing or with alternative processing. However, in the process 10 of FIG. 20, a PGM-containing material (preferably commuted) is combined with an aqueous acid, such as hydrochloric acid, to form an aqueous acidified solution containing one or more PGMs in step 12. A quantity of atleast one diquat is combined with an organic solvent to form an organic solution of the atleast one diquat in step 14. In step 16, the aqueous PGM solution from step 12 is intimately contacted with the organic diquat solution from step 14. During the contact, the diquats extract one or more of the PGMs, depending upon the diquat selected and the one or more PGM being targeted for extraction, to form one or more diquat/PGM complex. After forming the complex(es) in step 16, the two phases are separated in step 18, to form an aqueous solution containing the non-extracted metals and an organic solution 20 containing the diquat/PGM complex(es).

In step 22, the organic solution 20 is intimately contacted with an aqueous acid, such as hydrochloric acid, in order to back-extract the one or more PGMs from the diquat/PGM complex(es) of the organic solution 20 into the aqueous solution. The aqueous and organic phases are separated in step 24 to form an aqueous solution 26 contained acid and the one or more PGMs. The separation step 24 also yields an organic solution containing the diquats that may be reused for various number of extraction cycles in step 16.

The aqueous solution 26 containing acid and the one or more PGMs may be recyled through the contact step 22 for further back-extraction of the one or more PGMs for a selected number of cycles while building up the concentration of the PGMs. After the selected number of cycles or obtaining a PGM concentration, the solution 26 is subjected to separation of the PGM out of the solution in step 28, such as by electrodeposition of the PGMs onto an electrode.

The PGM-coated electrodes may then be used as stock for use in a variety of applications requiring the PGMs. Once the PGMs are taken out, the aqueous solution may also be recyled for further use in step 22.

It should be recognized that the process 10 of FIG. 20 may be performed in various modes, including batch, semi-batch, continuous, or semi-continuous processes. The process may also be performed at various scales, such as laboratory or industrial quantities. Furthermore, the individual steps may be accomplished with various unit processes. For example, the separation steps may be accomplished with gravity or centrifuging, and the contacting may include stirring or static mixing. Such exact process considerations are understood to be with the skill of a process designer.

The terms "comprising," "including," and "having," as used herein, shall be considered as indicating an open group that may include other elements not specified. The terms "a," "an," and the singular forms of words shall be taken to include the plural form of the same words, such that the terms mean that one or more of something is provided. The terms "preferably," "preferred," and "may" are used to indicate that the item, condition or step being referred to is an optional (not required) feature of the invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method comprising:
   (a) providing contact between an aqueous solution containing one or more metal anion complexes and an organic solution including a diquaternary amine, wherein the diquaternary amine has two diquaternary nitrogenes spaced at a distance of less than about 10 Å;
   (b) selectively binding at least one of the one or more metal anion complexes to the diquaternary amine;
   (c) separating the organic solution from the aqueous solution, wherein the diquaternary amine having the selectively bound metal anion complexes are concentrated in the organic solution and the balance of the one or more metal anion complexes are concentrated in the aqueous solution; and
   (d) back-extracting the selectively bound metal anion complexes from the diquaternary amine into an aqueous acid.

2. The method of claim 1, further comprising:
   (e) separating an organic diquat solution from the aqueous acid containing the one or more metal anion complex.

3. The method of claim 2, further comprising:
   (f) reusing the organic diquat solution separated by step (e) in step (a).

4. The method of claim 2, further comprising:
   (f) reusing the aqueous acid separated by step (e) in step (d).

5. The method of claim 2, further comprising:
   (f) separating the one or more metal anion complexes from the solution.

6. The method of claim 5, wherein the step of separating the one or more metal anion complexes includes electrode position onto an electrode.

* * * * *

UNITED STATES PATENT AND TRADEMARK OFFICE
CERTIFICATE OF CORRECTION

| | | |
|---|---|---|
| PATENT NO. | : 7,189,380 B2 | Page 1 of 1 |
| APPLICATION NO. | : 10/647104 | |
| DATED | : March 16, 2007 | |
| INVENTOR(S) | : Waheguru Pal Singh | |

It is certified that error appears in the above-identified patent and that said Letters Patent is hereby corrected as shown below:

Column 1, line 7 insert --This invention was made with government support under grant number DMI-0060201 awarded by the National Science Foundation (NSF). The government has certain rights in this invention.--

Signed and Sealed this

First Day of May, 2007

JON W. DUDAS
*Director of the United States Patent and Trademark Office*